US011151192B1

(12) United States Patent
Campbell

(10) Patent No.: US 11,151,192 B1
(45) Date of Patent: Oct. 19, 2021

(54) PRESERVING LOCALLY STORED VIDEO DATA IN RESPONSE TO METADATA-BASED SEARCH REQUESTS ON A CLOUD-BASED DATABASE

(71) Applicant: WAYLENS, INC., Waltham, MA (US)

(72) Inventor: Jeffery R. Campbell, Warkworth (CA)

(73) Assignee: WAYLENS, INC., Cambridge, MA (US)

(*) Notice: Subject to any disclaimer, the term of this patent is extended or adjusted under 35 U.S.C. 154(b) by 557 days.

(21) Appl. No.: 15/618,286

(22) Filed: Jun. 9, 2017

(51) Int. Cl.
| | | |
|---|---|---|
| G06F 16/783 | (2019.01) | |
| H04N 7/18 | (2006.01) | |
| G06K 9/32 | (2006.01) | |
| G06K 9/00 | (2006.01) | |
| B60R 1/00 | (2006.01) | |
| G06F 16/738 | (2019.01) | |
| G06F 16/78 | (2019.01) | |
| G05D 1/02 | (2020.01) | |

(52) U.S. Cl.
CPC ............ *G06F 16/7837* (2019.01); *B60R 1/00* (2013.01); *G06F 16/738* (2019.01); *G06F 16/7867* (2019.01); *G06K 9/00798* (2013.01); *G06K 9/00805* (2013.01); *G06K 9/00818* (2013.01); *G06K 9/325* (2013.01); *H04N 7/183* (2013.01); *B60R 2300/50* (2013.01); *G05D 1/0246* (2013.01)

(58) Field of Classification Search
CPC ............... G06F 16/7837; G06F 16/738; G06F 16/7867; G06K 9/00818; G06K 9/325; G06K 9/00805; G06K 9/00798; H04N 7/183; B60R 1/00; B60R 2300/50; G05D 1/0246

See application file for complete search history.

(56) References Cited

U.S. PATENT DOCUMENTS 6,005,591 A * 12/1999 Ogura .................... G09G 5/363
345/531
7,890,714 B1 * 2/2011 Tsaur .................. G06F 11/1458
711/162

(Continued)

OTHER PUBLICATIONS

Ken Belson, "The Wired Repo Man: He's Not 'As Seen on TV'", http://www.nytimes.com/2010/02/28/automobiles/28REPO.html:Feb. 26, 2010. pp. 1-3.

(Continued)

*Primary Examiner* — Cam Y T Truong
(74) *Attorney, Agent, or Firm* — Christopher P. Maiorana, PC

(57) ABSTRACT

A system comprising a capture device and a database. The capture device may be configured to (i) capture video, (ii) perform video analysis to extract metadata corresponding to the captured video, (iii) store the captured video data and (iv) communicate with a wireless device. The database may be configured to (i) generate search results for a user based on the metadata and (ii) provide the user (a) the metadata and (b) the video based on the search results. The metadata may be used to determine license plates present in the video. The database may provide the capture device an interrupt request to preserve a portion of the video based on the search results. The capture device may flag the portion of the video to prevent overwriting the portion of the video in response to the interrupt request.

20 Claims, 15 Drawing Sheets

(56) References Cited

U.S. PATENT DOCUMENTS

| | | | | |
|---|---|---|---|---|
| 9,779,309 | B1* | 10/2017 | Fink | G06K 9/00771 |
| 10,552,020 | B2* | 2/2020 | McLean | G06F 3/04845 |
| 2010/0070483 | A1* | 3/2010 | Delgo | G11B 27/034 |
| | | | | 707/706 |
| 2010/0087251 | A1* | 4/2010 | Collar | A63F 13/10 |
| | | | | 463/31 |
| 2014/0188808 | A1* | 7/2014 | Wolf | G06F 11/1451 |
| | | | | 707/654 |
| 2014/0214885 | A1* | 7/2014 | Park | G06F 16/783 |
| | | | | 707/769 |
| 2015/1458991 | | 9/2014 | Russell | H04N 7/181 |
| 2016/0048714 | A1* | 2/2016 | Mitsunaga | H04N 5/23203 |
| | | | | 235/375 |
| 2016/0173627 | A1* | 6/2016 | Herling | G06F 3/04883 |
| | | | | 709/205 |
| 2016/0295089 | A1* | 10/2016 | Farahani | G07C 5/008 |
| 2018/0225241 | A1* | 8/2018 | Howe | G06F 13/126 |

OTHER PUBLICATIONS

Gil Aegerter, "License plate data not just for cops: Private companies are tracking your car", https://www.nbcnews.com/news/other/license-plate-data-not-just-cops-private-companies-are-tracking-f6C10684677.Jul. 19, 2013, pp. 1-5.

Lora Kolodny, "Nauto raises $12 million for driverless car technology that's street-legal today", https://techcrunch.com/2016/04/13/nauto-raises-12-million-for-driverless-car-technology-thats-street-legal-today/Apr. 13, 2016, pp. 1-2.

Frederic Lardinois, "Google says its custom machine learning chips are often 15-30x faster than GPUs and CPUs", https://techcrunch.com/2017/04/05/google-says-its-custom-machine-learning-chips-are-often-15-30x-faster-than-gpus-and-cpus/, Apr. 5, 2017, pp. 1-2.

AaronTilley, "Nvidea Hopes To Stave Off AI Chip Competition With Volta Graphics Card", https://www.forbes.com/sites/aarontilley/2017/05/10/nvidia-tesla-v100-deep-learning-chips/#bb9e63f720d8, May 10, 2017, pp. 1-3.

* cited by examiner

PRESERVING LOCALLY STORED VIDEO DATA IN RESPONSE TO METADATA-BASED SEARCH REQUESTS ON A CLOUD-BASED DATABASE

FIELD OF THE INVENTION

The invention relates to video capture generally and, more particularly, to a method and/or apparatus for preserving locally stored video data in response to metadata-based search requests on a cloud-based database.

BACKGROUND

Dashboard cameras (i.e., dashcams) and other vehicle-mounted cameras are becoming increasingly popular. Video footage captured by a vehicle-mounted camera can be used for safety, insurance claim investigation and incident recreation. Not all vehicles are equipped with vehicle-mounted cameras. Video quality of cameras can vary and storage space is limited. Without vehicle-mounted cameras capable of performing onboard video analytics important events can be missed (i.e., car accidents). Even when the driver records an event, the driver only has one camera-angle.

Industry and government license plate databases hold a lot of historical data that provides limited usefulness. Current data in databases is limited to license plates and corresponding still pictures along with location and time information. The information is gathered from expensive systems developed for police and automobile repossession agents that employ spotter cars or tow truck drivers. Most drivers do not have access to license plate database information or access to video-mounted camera footage.

It would be desirable to implement preserving locally stored video data in response to metadata-based search requests on a cloud-based database.

SUMMARY

The invention concerns a system comprising a capture device and a database. The capture device may be configured to (i) capture video, (ii) perform video analysis to extract metadata corresponding to the captured video, (iii) store the captured video data and (iv) communicate with a wireless device. The database may be configured to (i) generate search results for a user based on the metadata and (ii) provide the user (a) the metadata and (b) the video based on the search results. The metadata may be used to determine license plates present in the video. The database may provide the capture device an interrupt request to preserve a portion of the video based on the search results. The capture device may flag the portion of the video to prevent overwriting the portion of the video in response to the interrupt request.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing preserving locally stored video data in response to metadata-based search requests on a cloud-based database that may (i) implement vehicle-mounted cameras configured to perform local video analytics, (ii) generate metadata corresponding to captured video, (iii) store metadata received from multiple vehicles, (iv) provide a searchable database of video metadata, (v) enable users to locate and purchase video footage, (vi) enable users to receive payments for providing video footage, (vii) provide map interfaces to enable users to search available video footage and metadata, (viii) enable users to request video footage based on search results, (ix) enable trickle uploading of video data on demand, (x) transfer data from a vehicle-mounted camera to a database via a user communication device, (xi) be implemented on a cloud-based database and/or (xii) use data effectively.

License Plate Recognition (e.g., LPR) technology may be configured to read information from a license plate on a vehicle. Cameras may be implemented to perform license plate recognition and/or object character recognition (OCR). In some embodiments, cameras used for performing license plate recognition may be stationary (e.g., permanently and/or semi-permanently mounted to a fixture such as a lamp post, a building, a street light, etc.). In some embodiments, cameras used for performing license plate recognition may be mobile (or attached to a moving object).

Figure 1:
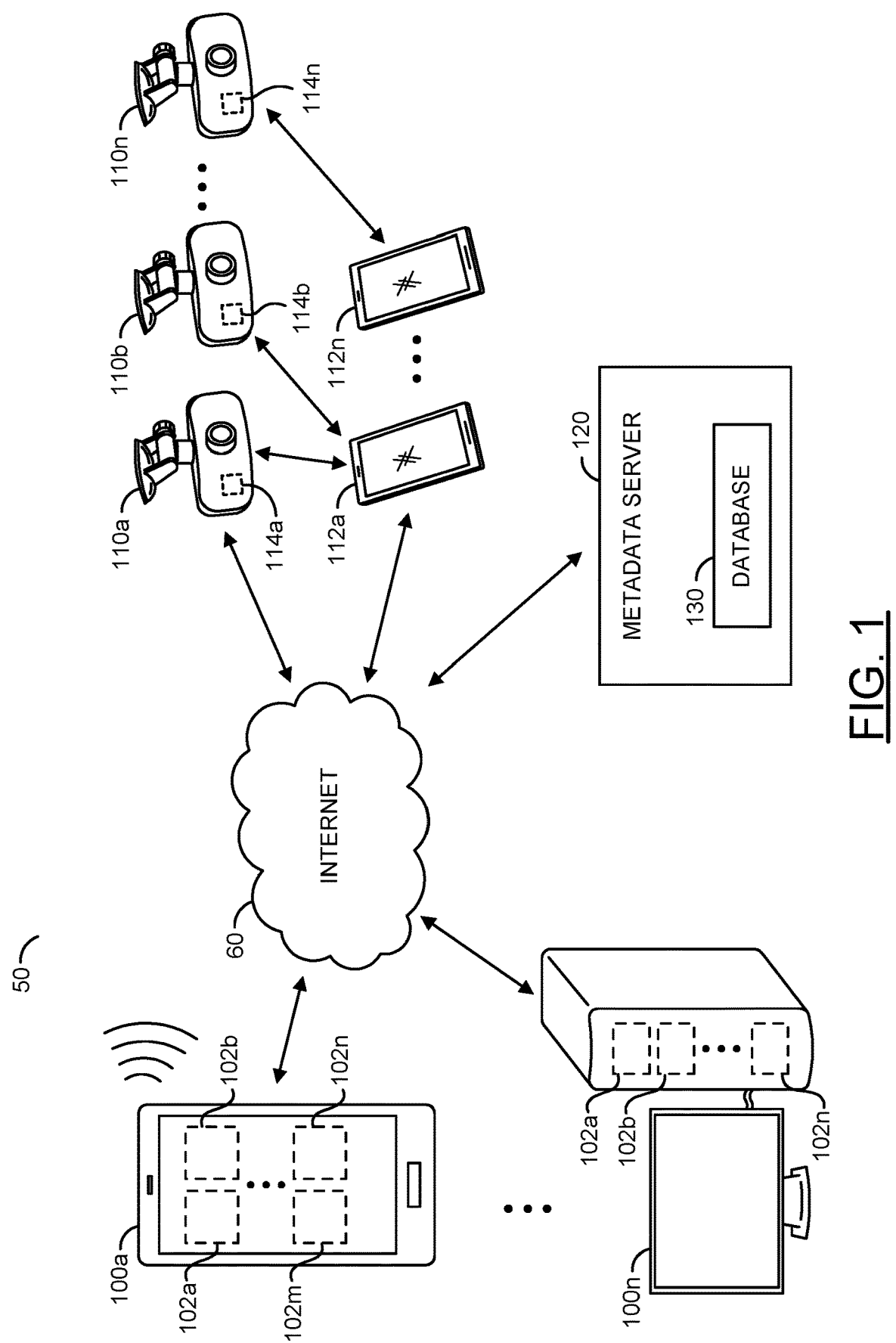
FIG. 1 is a diagram illustrating an example system in accordance with an embodiment of the present invention.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement subscriber devices (e.g., subscriber communication devices). The blocks 110a-110n may implement video capture devices. The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 100a-100n and/or the user communication devices 112a-112n may be configured to execute computer readable instructions (e.g., executable programs, apps, binaries, etc.). For example, the subscriber devices 100a-100n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 100a-100n and/or the user communication devices 112a-112n may be implemented as a vehicle capable of 3G/4G/LTE/5G communication (e.g., a vehicle with a touch-screen infotainment system). Generally, the subscriber devices 100a-100n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 100a-100n and/or the user communication devices 112a-112n may have similar implementations. For example, the user communication devices 112a-112n may be wireless communication devices. The type and/or features of the subscriber devices 100a-100n and/or the user communication devices 112a-112n may be varied according to the design criteria of a particular implementation.

Each of the subscriber devices 100a-100n may be configured to connect to the network 60 (e.g., hard-wired, Wi-Fi, etc.). The subscriber devices 100a-100n may be configured to store and/or execute the computer readable instructions 102a-102n. Executing the computer readable instructions 102a-102n may enable the subscriber devices 100a-100n to display various interfaces, generate output and/or receive input. For example, the app 102a may be a front-end for interacting with the system 50.

Each of the capture devices 110a-110n may be configured to capture video data. In some embodiments, the capture devices 110a-110n may be implemented as vehicle-mounted cameras (e.g., dashcams) to record video while a user drives the vehicle. In one example, each vehicle may be equipped with one of the capture devices 110a-110n. In another example, one vehicle may be equipped with more than one of the capture devices 110a-110n (e.g., to capture multiple fields of view and/or perspectives from the vehicle). In some embodiments, the capture devices 110a-110n may be cameras mounted at stationary locations (e.g., security cameras mounted on buildings). For example, the stationary camera may generate metadata used to determine roadway data. The implementation of the capture devices 110a-110n may be varied according to the design criteria of a particular implementation.

In some embodiments, the capture devices 110a-110n may be configured to communicate directly with the network 60. For example, the capture devices 110a-110n may comprise components implementing Wi-Fi communication and/or 3G/4G/LTE/5G (e.g., cellular) communication. In some embodiments, the capture devices 110a-110n may be configured to communicate indirectly with the network 60. For example, the capture devices 110a-110n may comprise short-range communication such as Bluetooth and/or Wi-Fi (e.g., short-range communication to a tethered device such as a smartphone). A cost of manufacturing the capture devices 110a-110n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 110a-110n may be lower when Bluetooth alone and/or Bluetooth/Wi-Fi is implemented compared to a camera that implements 3G/4G/LTE/5G hardware. Implementing the capture devices 110a-110n with a low cost may enable users to buy more than one of the capture devices 110a-110n and/or provide a larger user base. When the system 50 has more of the capture devices 110a-110n available to capture video data and/or provide metadata, more data points may be available for analysis. Generally, having more data points enables more useful analytical results generated by the system 50. In some embodiments, the capture devices 110a-110n may comprise a display and/or an input interface. For example, the capture devices 110a-110n may be configured to run apps (e.g., the computer executable instructions 102a-102n). In another example, the capture devices 110a-110n may be implemented as smartphones configured as cameras.

Each of the user communication devices 112a-112n may be configured to connect to the network 60 and/or the capture devices 110a-110n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, ZigBee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 110a-110n. In some embodiments, the user communication devices 112a-112n may be configured to send/receive data to/from the internet 60. For example, the user communication devices 112a-112n may receive data (e.g., video data, metadata, etc.) from one or more of the capture devices 110a-110n and transmit the data to the internet 60. In another example, the user communication devices 112a-112n may receive data (e.g., data requests, interrupt requests, firmware updates, etc.) from the internet 60 and transmit the data to the capture devices 110a-110n.

Generally, the user communication devices 112a-112n are implemented as portable devices (e.g., carried by a person, mounted in a vehicle, battery powered, etc.). The user communication devices 112a-112n may be configured to execute the computer readable instructions 102a-102n. In one example, the subscriber devices 100a-100n may store and/or execute one version (e.g., a subscriber version) of an app (e.g., the computer readable instructions 102a) and the user communication devices 112a-112n may store and/or execute another version (e.g., a provider version) of an app (e.g., the computer readable instructions 102b). One of the user communication devices 112a-112n may be configured to communicate with more than one of the capture devices 110a-110n (e.g., one smartphone may connect to multiple vehicle-mounted cameras in the same vehicle). In the example shown, the smartphone 112a communicates with the capture device 110a and the capture device 110b (e.g., the driver may have the smartphone and the vehicle may have two vehicle-mounted cameras). The connections between the user communication devices 112a-112n and/or the capture devices 110a-110n may be varied according to the design criteria of a particular implementation.

Each of the capture devices 110a-110n may comprise a respective block (or circuit) 114a-114n. The circuits 114a-114n may implement video processor functionality. In some embodiments, the circuits 114a-114n may be a system-on-chip (SoC). For example, the circuits 114a-114n may comprise input/output, a memory, processors, etc. The components and/or functionality of the circuits 114a-114n may be varied according to the design criteria of a particular implementation.

The circuits 114a-114n may be configured to record, encode, decode, transmit and/or store video data. The circuits 114a-114n may be configured to perform video analysis and/or video analytics. For example, the circuits 114a-114n may process video, identify patterns in the video data and/or recognize objects captured by the video data. Heuristics, templates and/or comparisons may be performed by the circuits 114a-114n to recognize and/or identify objects in captured video frames (e.g., video data) as objects that can be perceived by humans. In one example, the circuits 114a-114n may identify an object as a vehicle (or part of a vehicle such as a hood, a license plate, etc.). In another example, the circuits 114a-114n may identify text, shapes and/or colors. In yet another example, the circuits 114a-114n may identify objects (e.g., signs, pedestrians, street lights, etc.). The video data captured by the circuits 114a-114n may be stored by the capture devices 110a-110n. In one example, the circuits 114a-114n may implement a memory. In another example, the circuits 114a-114n may connect to an external memory (e.g., the capture devices 110a-110n may be configured to receive a flash memory such as a SD card, a microSD card, NAND memory, Compact Flash (CF) and/or an XD card).

The circuits 114a-114n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 114a-114n may comprise a GPS unit to determine GPS coordinates, a magnetometer to determine direction of travel and/or a real time clock (RTC) circuit to determine time.

The circuits 114a-114n may be configured to detect license plates. License plates may be detected, and the alphanumeric characters and/or symbols on the license plate may be identified. The license plate alphanumeric characters and/or symbols may be extracted from the captured video data as the metadata. For example, the circuits 114a-114n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 114a-114n when the video was recorded. The circuits 114a-114n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 102a-102n) to the subscriber devices 100a-100n and/or the user communication devices 112a-112n. The server 120 may be configured to generate interfaces (e.g., graphical user interfaces) based on stored data for the subscriber devices 100a-100n. For example, the server 120 may generate data to implement an interface, the data may be sent to the subscriber devices 100a-100n, the subscriber devices 100a-100n may interpret the data to generate a user interface, the user may interact with the user interface to provide requests, the subscriber devices 100a-100n may transmit the requests to the server 120 and the server may process the requests. Similarly, the capture devices 110a-110n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 110a-110n. In an example, the database 130 may store the metadata. Search parameters may be transmitted by the subscriber devices 100a-100n and the database 130 may be searched based on the search parameters. For example, the database 130 may enable the metadata to be associated with the video data stored by (and located on) the capture devices 110a-110n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 110a-110n to program participants (e.g., the users and/or the data producers). The data producers may install the capture devices 110a-110n. For example, the data producers may install the capture devices 110a-110n on vehicles as dashcams. The capture devices 110a-110n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 110a-110n).

The data producers may use the capture devices 110a-110n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 100a-100n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 100a-100n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 100a-100n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 110a-110n captured the video based on the video metadata (e.g., the metadata may comprise an ID of a camera and/or user that captured the video). The server 120 may send a request to the user communication devices 112a-112n and/or the capture devices 110a-110n to upload the recorded video. If the capture devices 110a-110n still have the requested video stored, a video upload may be initiated. The recorded video may be trickled (e.g., uploaded as a low priority data transfer) from the corresponding one of the capture devices 110a-110n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 110a-110n may be implemented with inexpensive hardware powerful enough to perform video analytics (e.g., license plate recognition (LPR)). The video analytics may be performed in real time, while capturing the video data. In one example, the capture devices 110a-110n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 110a-110n into a money making tool. For example, in the system 50 the drivers may own the capture devices 110a-110n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 110a-110n may be configured to overwrite stored video as new video data is captured (e.g., a loop recording). In an example of 40 hours of driving per week with the capture devices 110a-110n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 110a-110n. The provider of the system 50 may curate the resulting data generated by the data providers.

Figure 2:
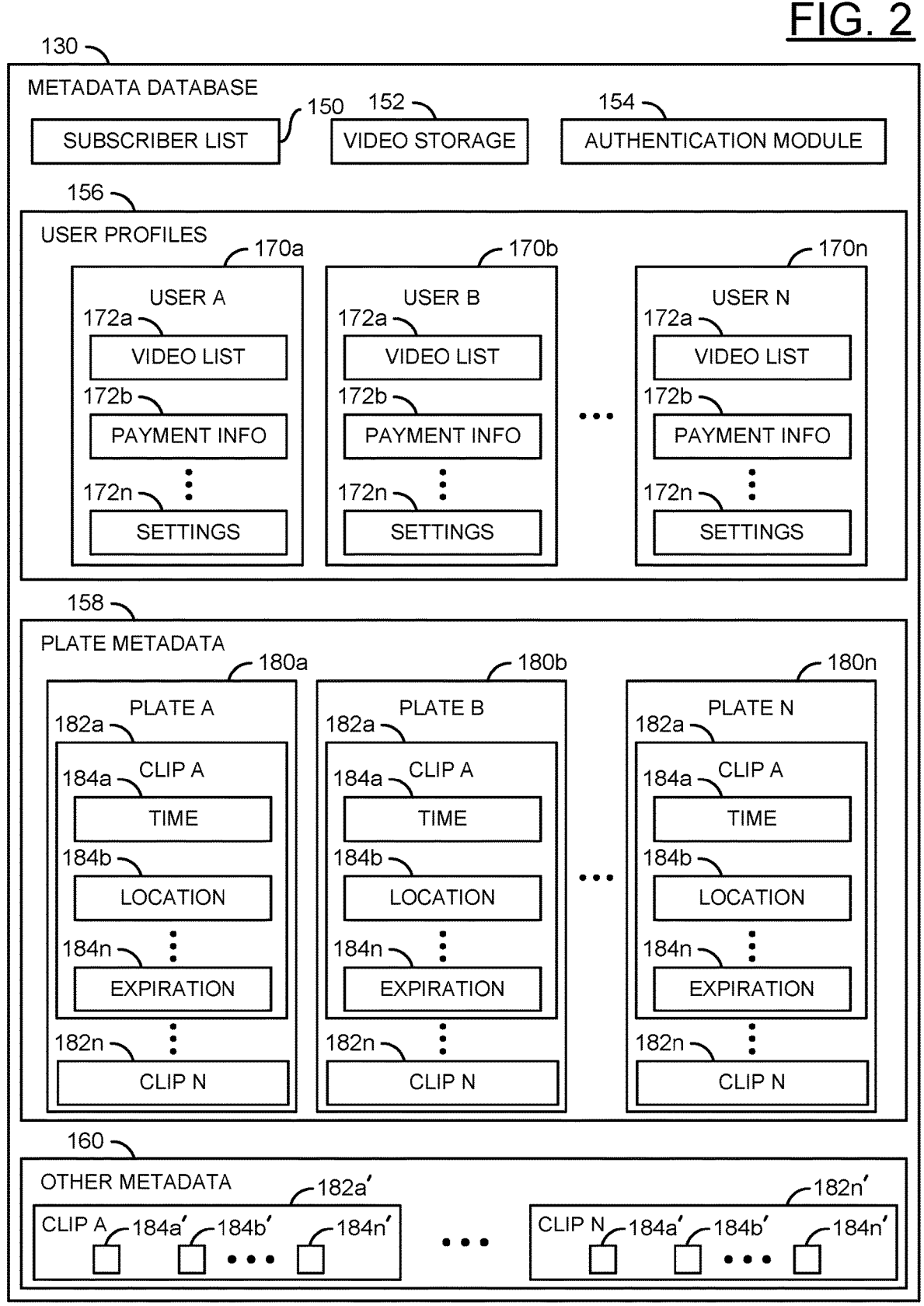
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156, a block (or circuit) 158 and/or a block (or circuit) 160. The block 150 may comprise a subscriber list. The block 152 may comprise video storage. The block 154 may comprise an authentication module. The block 156 may comprise user profiles. The block 158 may comprise plate metadata. The block 160 may comprise other metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 102a to enable the subscriber user to access the database 130 from the subscriber device 100a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 110a-110n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 100a-100n by providing a username, a password, and an additional key (e.g., a text message with a passcode provided to the smartphone 100a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 110a-110n and/or the user communication devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 110a-110n in exchange for providing the payment information 172b and if enough video data is provided (e.g., provided on a consistent basis) the data collector user may not be charged. If the capture device is not used enough (or not used regularly), a charge may be incurred (e.g., due to inactivity). In an example, the data provider may receive one of the capture devices 110a-110n free of charge and be able to use the camera as a regular dashcam as well as for providing data for the system 50. In one example, the data provider may not be charged for one of the capture devices 110a-110n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The plate metadata 158 may store information about various license plates 180a-180n. In some embodiments, each license plate that is read by the capture devices 110a-110n may be stored. Every time video metadata is uploaded to the database 130, the video metadata may be associated with the corresponding license plates 180*a*-180*n*. For example, if there is no prior license plate entry 180*a*-180*n*, a new license plate entry may be added to the plate metadata 158. In another example, if there is already a license plate entry 180*a*-180*n*, the new video data may be associated with the corresponding license plate entry 180*a*-180*n*.

Each of the license plate entries 180*a*-180*n* may comprise a number of associated clips 182*a*-182*n*. The clips 182*a*-182*n* may comprise metadata entries for each time a license plate has been read by one of the capture devices 110*a*-110*n*. For example, each time a license plate is detected, a new one of the clips 182*a*-182*n* may be appended to the corresponding one of the license plate entries 180*a*-180*n*. Each of the clips 182*a*-182*n* may comprise metadata 184*a*-184*n*. The metadata 184*a*-184*n* may comprise the video metadata.

The video metadata 184*a*-184*n* may comprise the data extracted by the capture devices 110*a*-110*n* from the video recorded by the capture devices 110*a*-110*n* and/or data associated with the video recorded by the capture devices 110*a*-110*n*. The video metadata 184*a*-184*n* may be configured to provide useful information to identify vehicles, times, locations and/or other data about the recorded videos. The video metadata 184*a*-184*n* may be the data checked by the database 130 to determine results for a search query from the subscriber users. The video metadata 184*a*-184*n* may be used to approximate what may be recorded and/or visible when viewing the corresponding recorded video.

In one example, the video metadata 184*a* may comprise a time. The time 184*a* may indicate a date and/or time of day when the corresponding video was recorded (e.g., a timestamp). The time 184*a* may be used to find recorded video that occurred at a particular time. In another example, the video metadata 184*b* may comprise a location. The location 184*b* may comprise GPS coordinates corresponding to the recorded video. The location 184*b* may be used to find recorded video that was captured at a particular location (e.g., at an intersection). In yet another example, the video metadata 184*n* may comprise an expiration flag. The expiration flag 184*n* may indicate whether or not the recorded video is still available (e.g., stored in the memory of the capture device, has not been overwritten, etc.). For example, the expiration flag 184 may have a particular value (e.g., a logical one value) if the video has been overwritten. If the expiration flag 184*n* indicates that the recorded video is no longer available, the video metadata 184*a*-184*n* may still provide useful information. Other types of metadata 184*a*-184*n* may be stored (e.g., a user ID of the data provider, direction of the capture devices 110*a*-110*n*, video quality of the captured video, etc.). The types and/or amount of video metadata 184*a*-184*n* may be varied according to the design criteria of a particular implementation.

The other metadata 160 may store information about various data extracted from the video data. In some embodiments, the other metadata 160 may store data in a similar arrangement as the plate metadata 158. The other metadata 160 may comprise the clips 182*a*'-182*n*'. Each of the clips 182*a*'-182*n*' may comprise general metadata 184*a*'-184*n*'. Some of the general metadata 184*a*'-184*n*' may store information similar to the metadata 184*a*-184*n* (e.g., a timestamp, location information, direction of the camera, device ID, etc.). For example, the metadata 184*a*-184*n* may correspond to metadata for the license plate entries 180*a*-180*n* and the general metadata 184*a*'-184*n*' may correspond to other information (e.g., information not related to license plate data).

The circuits 114*a*-114*n* may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 114*a*-114*n* may be configured to determine roadway data in real time. In one example, the general metadata 184*a*'-184*n*' may store information corresponding to a type of vehicle detected (e.g., color of a car, make of a vehicle, model of a vehicle, year of a vehicle, speed of a vehicle, etc.). In another example, the general metadata 184*a*'-184*n*' may comprise roadway data (e.g., a lamp post detected, a street sign detected, a shape of a roadway detected, conditions of the road detected, etc.). The type of information stored as the general metadata 184*a*'-184*n*' in the other metadata 160 may be varied according to the design criteria of a particular implementation.

The database 130 may be configured to index the video metadata and/or associate new video metadata with license plate numbers in real time. The database 130 may arrange the data to enable efficient filtering of information to provide fast search results for the subscriber users. In the example shown, the video metadata 184*a*-184*n* is arranged according to the license plates 180*a*-180*n*. In another example, the video metadata 184*a*-184*n* may be arranged based on a time, a location, a camera ID, etc.). The arrangement of the storage of the data in the database 130 may be varied according to the design criteria of a particular implementation.

The database 130 may be configured to create a database entry for each incoming license plate (e.g., the plates 180*a*-180*n*). In one example, the video metadata 184*a*-184*n* for the clip 182*a* of the plate 180*a* may comprise information such as id="1", 1p="5SAM333", date="20170307", time="14:30", alt="141.46354", lat="37.804440" and/or lng="−122.422874". In another example, the video metadata 184*a*-184*n* for the clip 182*i* of the plate 180*a* may comprise information such as id="2", 1p="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180*a*-180*n* to avoid parsing all stored data in order to filter out license plate results in real time.

Figure 3:
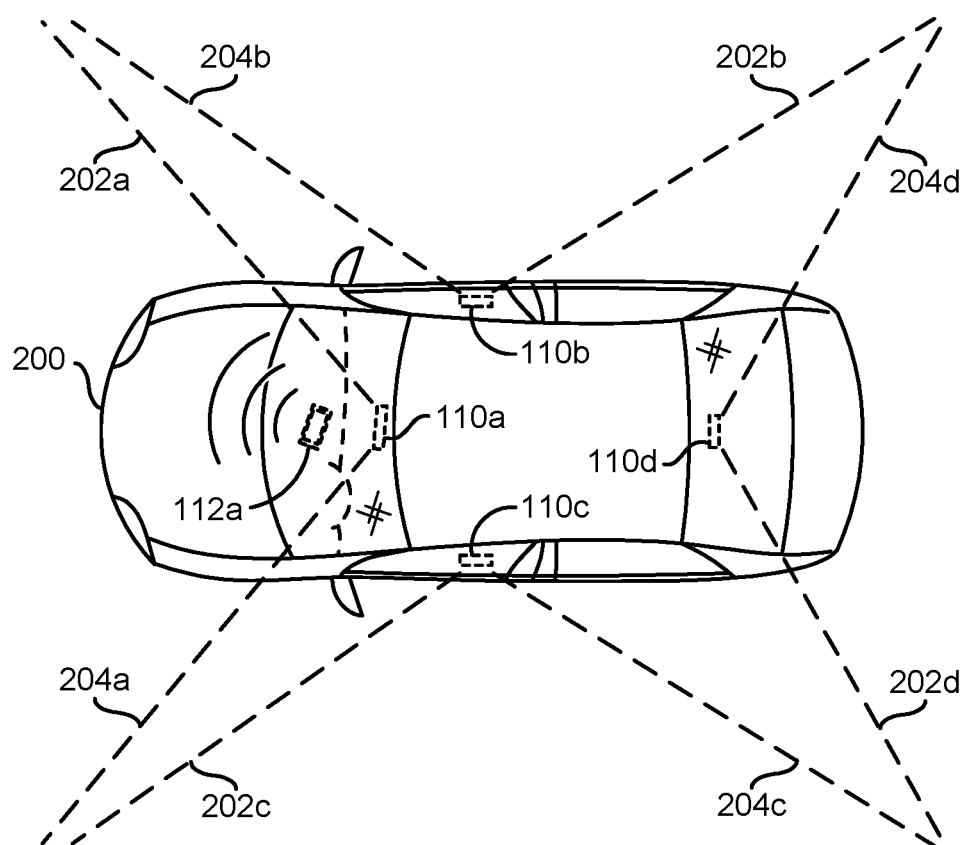
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 110*a*-110*n*. In the example shown, the capture device 110*a* may be installed facing the direction of travel of the vehicle 200, the capture device 110*b* may be installed directed away from a passenger side of the vehicle 200, the capture device 110*c* may be installed directed away from a driver side of the vehicle 200 and the capture device 110*d* may be installed directed facing opposite from the direction of travel of the vehicle 200.

The user communication device 112*a* is shown in the vehicle 200. In the example shown, the user communication device 112*a* may be a smartphone communicating to the network 60 (e.g., via a 3G/4G/LTE/5G wireless connection). For example, each of the installed cameras 110*a*-110*d* may communicate with the smartphone 112*a* (e.g., creating a local network) and the smartphone 112*a* may communicate with the external network 60. In the example shown, the capture devices 110*a*-110*d* may be positioned on the windows of the front, side and back of the vehicle 200 (e.g., suction cupped from the inside of the vehicle 200). The number, installation and/or locations of the capture devices 110a-110n in a vehicle may be varied according to the design criteria of a particular implementation and/or a preference of the data provider.

A line 202a and a line 204a are shown extending from the capture device 110a. The line 202a and the line 204a may represent a field of view captured by the capture device 110a. The field of view of the capture device 110a may record video of a view from the front of the vehicle 200 (e.g., from a perspective of a front of the vehicle 200). A line 202b and a line 204b are shown extending from the capture device 110b. The line 202b and the line 204b may represent a field of view captured by the capture device 110b. The field of view of the capture device 110b may record video of the view from the right of the vehicle 200 (e.g., from a perspective of a passenger side of the vehicle 200). A line 202c and a line 204c are shown extending from the capture device 110c. The line 202c and the line 204c may represent a field of view captured by the capture device 110c. The field of view of the capture device 110c may record video of the view from the left of the vehicle 200 (e.g., from a perspective of a driver side of the vehicle 200). A line 202d and a line 204d are shown extending from the capture device 110d. The line 202d and the line 204d may represent a field of view captured by the capture device 110d. The field of view of the capture device 110d may record video of the view from the rear of the vehicle 200 (e.g., from a perspective of a back of the vehicle 200).

The vehicle 200 may have a number of the capture devices 110a-110n installed. In the example shown, four of the capture devices 110a-110n may be installed. For example, the cameras may be directed for a "drive mode" (e.g., the camera 110a directed forward, and the camera 110d directed backwards) and the cameras may be directed for a "trawl mode" (e.g., the camera 110b and the camera 110c each directed sideways). For example, the trawl mode may be useful when in parking lots. The number of the capture devices 110a-110n installed on the vehicle 200 may be varied according to the design criteria of a particular implementation.

Figure 4:
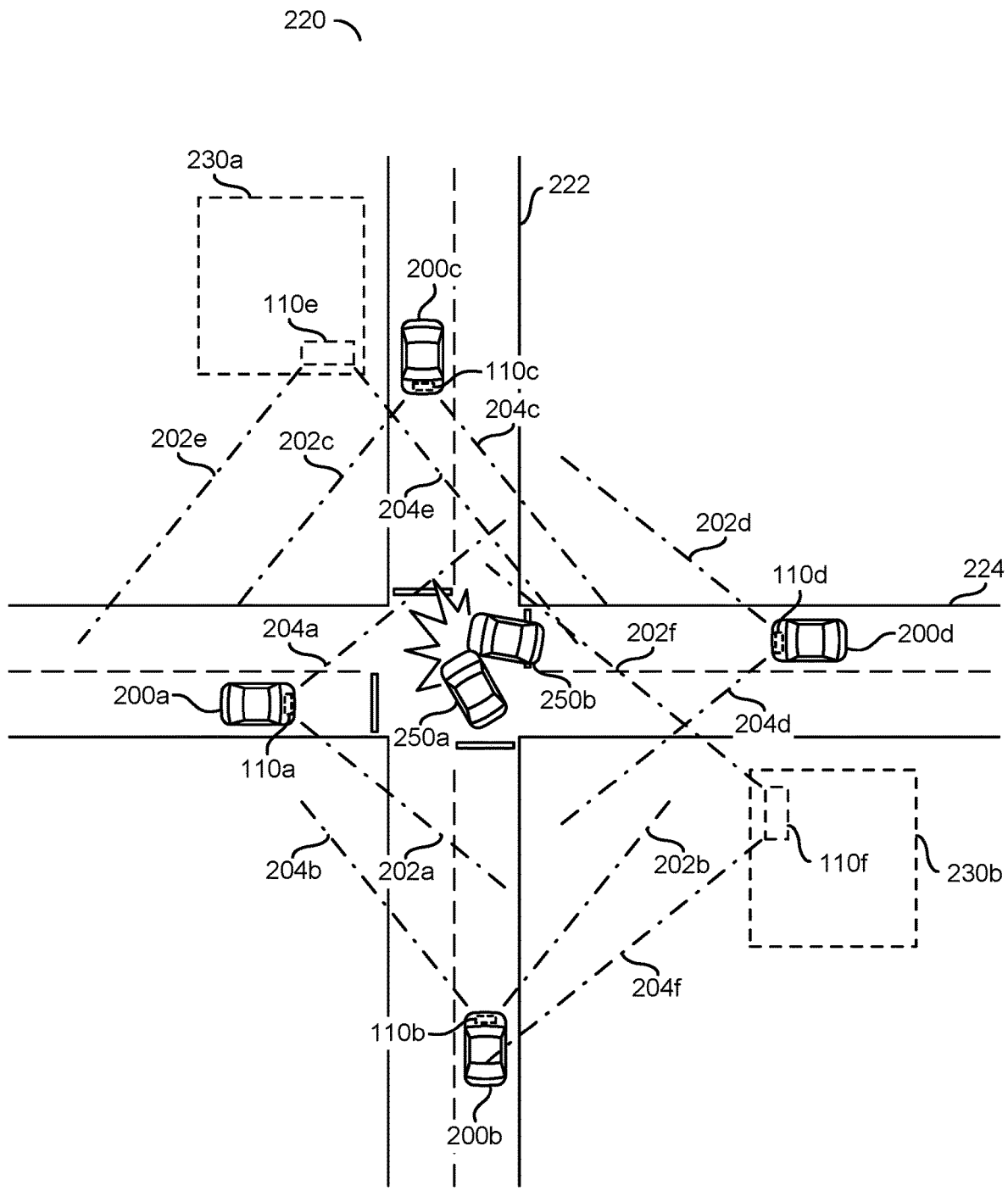
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 110a installed, the vehicle 200b may have the capture device 110b installed, the vehicle 200c may have the capture device 110c installed and/or the vehicle 200d may have the capture device 110d installed. The drivers of the vehicle 200a, the vehicle 200b, the vehicle 200c and/or the vehicle 200d may be data providers. A building 230a and a building 230b are shown. The building 230a may have the capture device 110e installed and the building 230b may have the capture device 110f installed as a security camera. In some embodiments, one or more of the capture devices 110a-110n may be implemented as stationary cameras. The owner of the building 230a and the owner of the building 230b may be data providers for the system 50 (e.g., capture video of the event 220).

The capture device 110a may capture one field of view (e.g., the line 202a and the line 204a) from the viewpoint of the vehicle 200a. The capture device 110b may capture one field of view (e.g., the line 202b and the line 204b) from the viewpoint of the vehicle 200b. The capture device 110c may capture one field of view (e.g., the line 202c and the line 204c) from the viewpoint of the vehicle 200c. The capture device 110d may capture one field of view (e.g., the line 202d and the line 204d) from the viewpoint of the vehicle 200d. The capture device 110e may capture one field of view (e.g., the line 202e and the line 204e) from the viewpoint of the building 230a. The capture device 110f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 110a-110f of the event 220. For example, the database 130 may receive six different user IDs of the data provider users. The database 130 may receive six slightly different GPS co-ordinates corresponding to the different locations of the cameras 110a-110f. In some embodiments, the database 130 may receive the same timestamp from each of the capture device 110a-110f. In some embodiments, the timestamp may be slightly different because the video files may be stored as video clips having a pre-determined time (e.g., 2 minute video clips) and the start and end time of each video clip may depend on when the cameras 110a-110f were booted up (e.g., when the vehicles 200a-200d were started). In some embodiments, system 50 may be configured to synchronize the time on each of the capture devices 110a-110n (e.g., to ensure the timestamp for a start and end time of each video clip matches between the capture devices 110a-110n). The database 130 may receive up to 6 different direction metadata information. In some embodiments, multiple clips 182a-182n with metadata information 184a-184n and/or general metadata 184a'-184n' may be received (e.g., depending on the length of the event 220).

The video metadata from each of the cameras 110a-110f may be uploaded to the database 130. Since two vehicles (e.g., 250a-250b) are in the car accident, the database 130 may associate the video metadata 184a-184n with two license plates entries (e.g., 180a for the vehicle 250a and 180b for the vehicle 250b). Depending on the fields of view, some of the cameras 110a-110n may not capture both license plates (e.g., the field of view of the camera 110b may capture the license plate of the vehicle 250a but not capture the license plate of the vehicle 250b). License plate entries may be made for the data provider vehicles 200a-200d (e.g., the capture device 110a may capture the license plate of the vehicle 200d). Similarly, the general metadata 184a'-184n' entries may be made for the data provider vehicles 200a-200n in addition to license plate information, or when license plate information is not available (e.g., obscured in the video).

The video metadata 184a-184n may be extracted from the video data captured by each of the capture devices 110a-110n. The video metadata 184a-184n may be associated with one of the clips 182a-182n for each of the license plate entries 180a-180n corresponding to a vehicle detected in the field of view. In one example, the license plate entry 180a may correspond to the vehicle 250a and the metadata 184a-184n generated by the capture device 110a may be associated with the clip 182*a* for the plate entry 180*a* in the database 130. In another example, the metadata 184*a*-184*n* generated by the capture device 110*b* may be associated with the clip 182*b* for the plate entry 180*a* in the database 130. Similarly, the license plate entry 180*b* may correspond to the vehicle 250*b* and the metadata 184*a*-184*n* generated by the capture device 110*a* may be associated with the clip 182*a* for the plate entry 180*b* in the database 130. In another example, the metadata 184*a*-184*n* generated by the capture device 110*b* may be associated with the clip 182*b* for the plate entry 180*b* in the database 130. The subscriber users may use the subscriber devices 100*a*-100*n* (e.g., via the app and/or web interface 102*a*) to search the metadata 184*a*-184*n* to view any videos that may have been captured of the event 220.

In some embodiments, the capture devices 110*a*-110*n* may implement Wi-Fi communication (e.g., to transmit the metadata and/or the recorded videos to the network 60). Implementing the Bluetooth communication to transfer data between the capture devices 110*a*-110*n* and the user communication devices 112*a*-112*n* may be useful in the vehicles (e.g., 200*a*-200*d*) to forward metadata and/or recorded videos to the network 60. In some embodiments, the capture devices 110*a*-110*n* may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 110*a*-110*n* could be placed to face out a window of a home and/or business (e.g., similar to a consumer IP camera). Connecting the capture devices 110*a*-110*n* to a Wi-Fi access point may enable the cameras 110*a*-110*n* to operate like a consumer IP Camera but additionally provide the video metadata 184*a*-184*n* (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 110*a*-110*n* in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250*a*, the driver of the vehicle 250*b*, an insurance company representing the drivers of the vehicles 250*a*-250*b*, and/or another user) searches the video metadata 184*a*-184*n* (or the general metadata 184*a*'-184*n*') in the database 130, a list of videos of the event 220 may be provided. If the subscriber user decides to request a video recording of the event, the server 120 may send a request to one or more of the capture devices 110*a*-110*n* (or the associated user communication device 112*a*-112*n*). The circuits 114*a*-114*n* may set a flag for the requested video in response to the request from the server 120. Setting the flag for the requested video may be used to preserve the requested video recording (e.g., prevent the video from being over-written). The capture devices 110*a*-110*n* and/or the user communication devices 112*a*-112*n* may upload the video data to the server 120. In some embodiments, the associated video may be preserved for all data points that may be returned as search results of a search query. For example, the server 120 may send the request to one or more of the capture devices 110*a*-110*n* (or the associated user communication device 112*a*-112*n*) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 110*a*-110*n* that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 110*a*-110*n* in the vicinity may start preserving data. In one example, if the VIP event is happening presently, the video data being currently recorded may be preserved. In another example, the video data currently residing in the memory of the capture devices 110*a*-110*n* associated with the time of the event may be preserved (e.g., a crime is reported after the event occurs and later an interrupt request is provided to the capture devices 110*a*-110*n* to preserve potential evidence).

Figure 5:
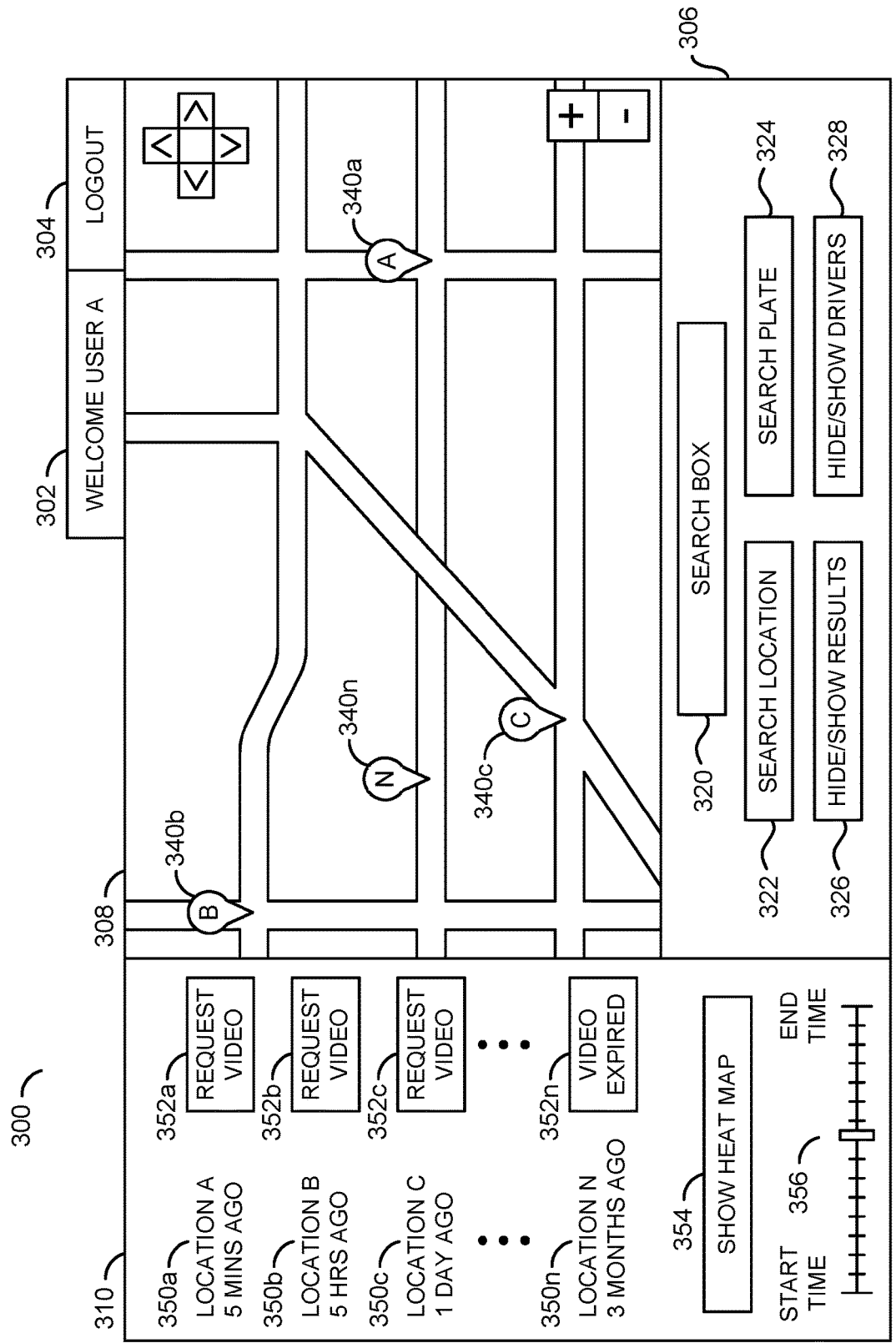
FIG. 5 is a diagram illustrating an example interface.

Referring to FIG. 5, a diagram illustrating an example interface 300 is shown. In an example, the subscriber user may view and/or interact with the interface 300 by accessing the app (or web interface) 102*a* using one of the subscriber devices 100*a*-100*n*. The interface 300 may be implemented by the system 50 to provide user-friendly input and/or access to the database 130. The subscriber user may input search queries to the database 130 using the interface 300.

The interface 300 may comprise a user greeting 302. The user greeting 302 may indicate which user from the subscriber list 150 is logged in. The user greeting 302 may provide a link to an account of the subscriber user (e.g., to edit settings and/or preferences). The interface 300 may comprise a logout 304. The interface 300 may comprise a search request panel 306, a map view 308 and/or a results panel 310. The design, layout and/or content of the interface 300 may be varied according to the design criteria of a particular implementation.

The search request panel 306 may be configured to receive input from the subscriber user. In the example shown, the search request panel 306 may comprise a search box 320, a location search option (or button) 322, a plate search option (or button) 324, a results toggle (or button) 326 and/or a driver toggle (or button) 328. For example, the results toggle 326 may toggle the visibility of the results panel 310 (e.g., hiding the results panel 310 may provide more space for the map view 308). Other input may be presented in the search request panel 306 (e.g., time, date, data provider user ID, etc.). The input available in the search request panel 306 may be varied according to the design criteria of a particular implementation and/or available search parameters for the database 130.

The map view 308 may be configured to provide a visual representation of where search results are located. For example, the map view 308 may provide a graphical representation of the results of the search queries. The map view 308 may generate a map representation (e.g., a street view, a city view, etc.) to indicate where video recordings occurred (based on the video metadata 184*a*-184*n*). In one example, the map view 308 may be implemented using an application programming interface (API) provided by a third party (e.g., Google Maps, Bing Maps, Apple Maps, OpenStreetMap, etc.). Pin icons 340*a*-340*n* are shown on the map view 308. The pin icons 340*a*-340*n* may be visual indicators representing hits generated in response to a search query of the metadata 184a-184n. For example, the pin icons 340a-340n may represent where the vehicles were seen at a particular time (e.g., captured on video). The driver toggle button 328 may be used to select between hiding and showing the pin icons 340a-340n.

The results panel 310 may be configured to provide textual information about results from search queries. Metadata results 350a-350n are shown. The metadata results 350a-350n may be generated in response to the video metadata 184a-184n in the database 130. In one example, the metadata results 350a-350n may be presented in chronological order. Options may be provided for sorting the metadata results 350a-350n (e.g., chronological order, reverse chronological order, nearest location, farthest location, etc.). The metadata results 350a-350n may provide some or all of the video metadata 184a-184n. The metadata results 350a-350n may correspond to the pin icons 340a-340n on the map view 308. For example, the metadata results 350a may correspond to the pin icon 340a. In the example shown, the metadata results comprise a location and a time. For example, the location may comprise a longitude, latitude and altitude. In another example, the time may be presented as a date and timestamp and/or a difference from the present time (e.g., 1 hour ago).

Each of the metadata results 350a-350n may have a corresponding video button 352a-352n. The video buttons 352a-352n may provide a link to initiate a request to receive the recorded video (e.g., a video request) from the capture devices 110a-110n. The system 50 may transmit the video request to one or more of the capture devices 110a-110n to preserve the video and/or upload the recorded video. In the example shown, the video button 352n indicates that the video corresponding to the metadata result 350n has expired (e.g., no longer stored by one of the cameras 110a-110n). The video button 352n may provide the video metadata 184a-184n (or the general metadata 184a'-184n') corresponding to the metadata result 350n (e.g., in a format that may be copied and pasted, in a particular file format, in a comma separate value format, etc.). The metadata result 350n may still be useful even if the recorded video is no longer available. For example, the metadata results 350n may be valuable when the data provider has captured license plates just before and/or just after the time of an accident (e.g., the metadata may be used by police or others that are able to cross reference license plate to an automobile owner). The metadata results 350a-350n, even without video, may be able to be used by the police to contact witnesses to the event. The metadata results 350a-350n, with or without video, may be used in accident investigation, asset recovery (e.g., stolen vehicles and/or items), locating persons-of-interest and/or crime investigations.

The results panel 310 may also comprise a heat map toggle (or button) 354 and/or a time range input (or slider) 356. The heat hap toggle 354 may activate/deactivate a heat map view (to be described in more detail in association with FIG. 8). The time range input 356 may be configured to adjust the map view 308. For example, adjusting the time range input 356 may adjust the locations of the pin icons 340a-340n to correspond with the location of the detected license plate at a particular time. The slider 356 may show time of day, day of week occurrences and/or generate a report based on the metadata results 350a-350n.

The subscriber user may log onto the web interface 300 (e.g., if the credentials match the subscriber list 150). The interface 300 may be generated and the subscriber user may have various options. One option may be to enter an address (e.g., in the search box 320 and/or using the button 322). Another option may be to enter a license plate as an alpha-numeric string (e.g., in the search box 320 and/or using the button 324). The subscriber user may search using location information, time information, and or license plate information as a query. Some searches may be searches for metadata including a location and time but no license plate information. Some searches may be searches for metadata including license plate information without a location. Some searches may be searches for characteristics of an object (e.g., a color of a vehicle, a make of a vehicle, a model of a vehicle, etc.).

The database 130 may be queried against the metadata 184a-184n of the plate metadata 158 and/or the general metadata 184a'-184n' of the other metadata 160. If the database 130 determines that there are hits (e.g., matches) for the location vicinity and/or time frame the map view 308 may be updated with numbered pins 340a-340n (or other types of identification). The pin icons 340a-340n may appear on the map view 308 grouped around the location of the search query. The results panel 310 may display metadata results 350a-350n corresponding to the pin icons 340a-340n. The video buttons 352a-352n may correspond to each of the pin icons 340a-340n.

Since each driver may drive a different amount of time and/or use external memory (e.g., a SD card) having a different capacity, the life of the video file (e.g., time before the file is overwritten) may be different for each driver. When recorded video is removed from the capture devices 110a-110n (e.g., overwritten by the newest video) the capture device 110a-110n and/or the user communication device 112a-112n may send an update to the database 130 as a notification of the expiration. For example, the video metadata field 184n of the corresponding clip 182a-182n may be updated. In some embodiments, the pin icons 340a-340n may be color coded based on an expected (or anticipated) amount of time that the video recording may be available. Based on the historical driving patterns of each of the data providers, the server 120 may determine an approximation of how long the video recording will last before being overwritten. For example, the pin icons 340a-340n may be green colored to indicate that the subscriber user may likely have a day or two to retrieve the recorded video. In another example, the pin icons 340a-340n may be orange colored to indicate less time (e.g., within a day until expiration). In yet another example, the pin icons 340a-340n may be red colored to indicate that the video will be overwritten shortly (e.g., within a few hours).

In some embodiments, the interface 300 may enable the subscriber user to interact with the pin icons 340a-340n (e.g., click, tap, etc.). Interacting with the pin icons 340a-340n may provide an option to request the video (e.g., similar functionality as the request video buttons 352a-352n). If the subscriber requests a video, the video request may be sent to the cloud (e.g., the network 60), then to a corresponding one of the user communication devices 112a-112n (e.g., the smartphone that may be associated with the capture device 110a-110n that recorded the video), and subsequently to the corresponding (e.g., target) one of the capture devices 110a-110n to initiate a transfer of the recorded video. The video may be trickled (since Bluetooth has limited bandwidth) from the capture devices 110a-110n, to the user communication devices 112a-112n, to the cloud 60 and then to the server 120. The subscriber user may then be notified that the recorded video is available to download.

Figure 6:
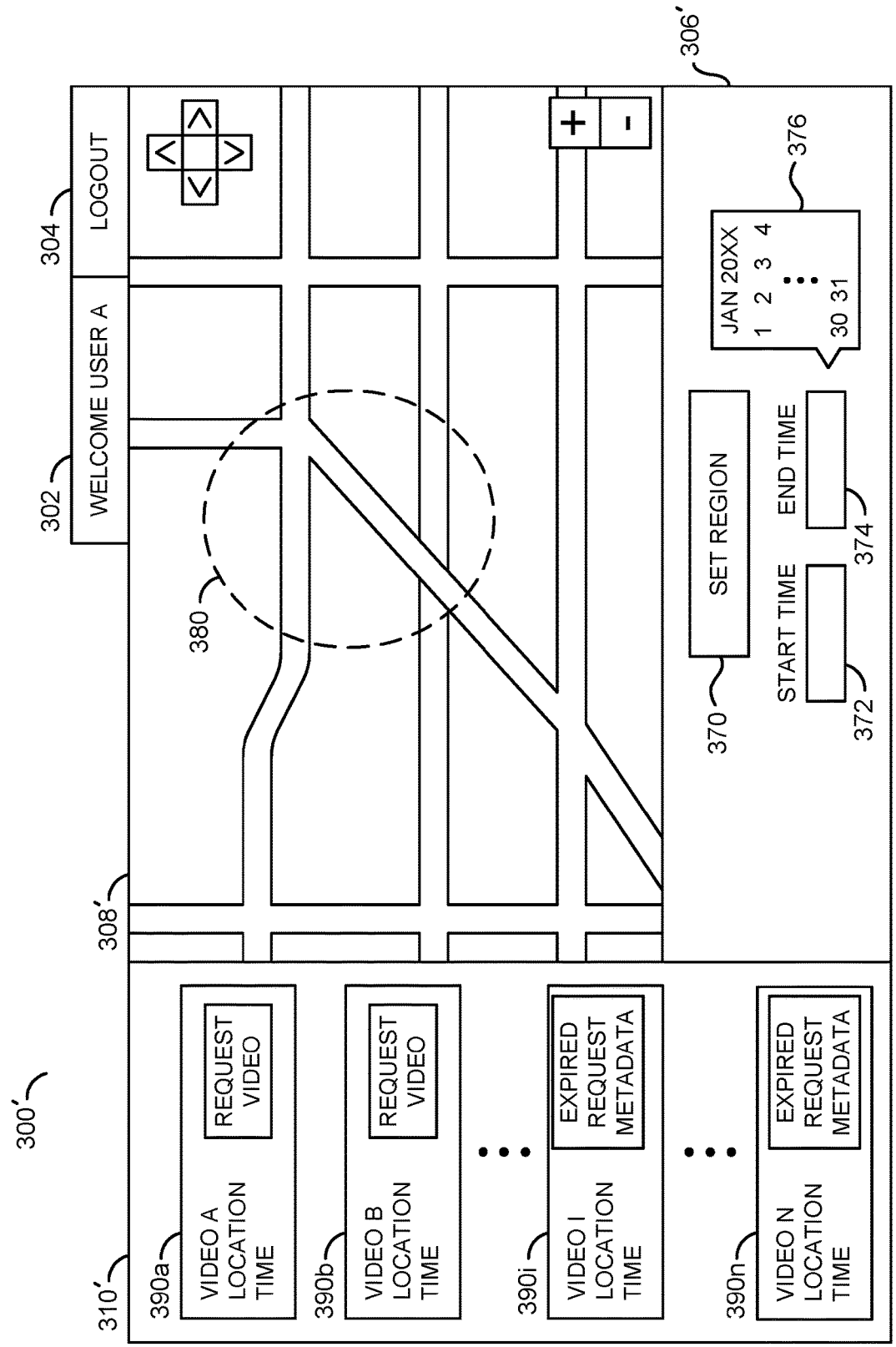
FIG. 6 is a diagram illustrating an example interface implementing a region and date range.

Referring to FIG. 6, a diagram illustrating an example interface 300' implementing a region and date range is shown. The interface 300' may have a similar implementation as described in association with FIG. 5. The interface 300' may comprise the user greeting 302, the logout 304, the search request panel 306', the map view 308' and/or a results panel 310'.

The search request panel 306' may comprise a set region button 370, a start time range input 372, an end time range input 374 and/or a date input 376. The map view 308' may comprise a search region 380. In the example shown, the search region 380 is a region having a circular shape. The shape and/or size of the region 380 may be varied based on the input of the subscriber user. The results panel 310' may comprise search results 390a-390n. The search results 390a-390n may comprise the metadata results and/or the video request buttons (as described in association with FIG. 5).

The subscriber user may interact with the map view 308' to provide an input that indicates the region 380. In some embodiments, the subscriber user may drop a pin icon (e.g., click and/or tap on the map) to indicate location. In some embodiments, the subscriber user may manually enter a location (e.g., using text input to define a location and a distance range around the location). In some embodiments, the subscriber user may draw a shape manually (e.g., by dragging a shape tool over the map view 308' to draw a pre-defined and/or freeform shape). For example, the region 380 may be set after the subscriber user releases the mouse button after holding the mouse button to draw the shape (e.g., the set region button 370 may not be implemented). The subscriber user may use the start time input 372, the end time input 374 and/or the date input 376 to specify a time frame (e.g., a range of times).

A query may be sent to the database 130 to search the radius around the location region 380 along with the time range defined by the input 372, the input 374 and/or the input 376. The database 130 may return results for videos that may exist (or video recordings that did exist but are now deleted). The results panel 310' may provide details of the search results and the subscriber user may push another button to request the video (if the video exists).

If the video no longer exists, the subscriber user may still be able to see the metadata results from the now expired video. For example, the search results 390a-390n may present the subscriber user with a list of license plates of vehicles that may have a high probability of witnessing a particular event (e.g., that were present a pre-determined amount of time before, during and/or a pre-determined amount of time after the event occurred, that had a field of view facing the event, etc.). In some embodiments, the event may be defined as the address and/or time that the subscriber user has entered for the search query. In some embodiments, the data providers may submit contact information (e.g., an email address, a phone number, a private messaging system may be implemented, etc.) to enable the subscriber users to request an eyewitness to an event (e.g., when the video recording is no longer available).

Figure 7:
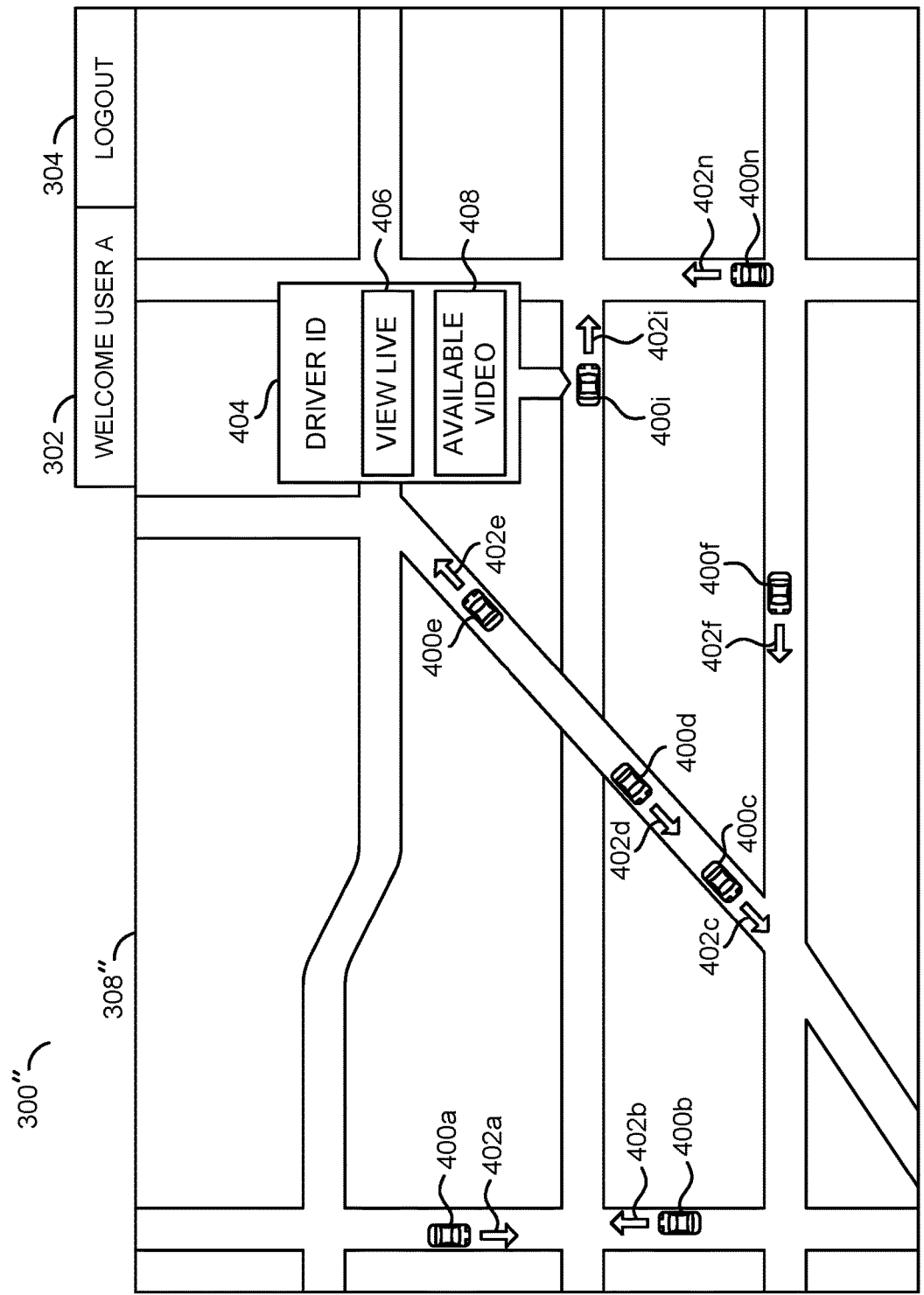
FIG. 7 is a diagram illustrating an example interface implementing a real-time and/or historical view of vehicles that are capturing video and/or vehicles previously captured on video.

Referring to FIG. 7, a diagram illustrating an example interface 300" implementing a real-time and/or historical view of vehicles that are capturing video and/or vehicles previously captured on video is shown. The interface 300" may have a similar implementation as described in association with FIG. 5. The interface 300" may comprise the user greeting 302, the logout 304 and/or the live view 308". In some embodiments, the interface 300" may be adjusted based on the settings and/or preferences of the subscriber user using the app (or web interface) 102a. In the example shown, the live view 308" may be expanded and other portions of the interface 300" (e.g., the search panel 306 and/or the results panel 310) may be hidden.

The map view may comprise the vehicle icons 400a-400n. The vehicle icons 400a-400n may be visual indicators representing a last known position (or current position) of the data providers (or a subset of data providers in a particular locality). For example, the vehicle icons 400a-400n may be generated by the app 102a and/or the subscriber devices 100a-100n in response to data from the server 120 (e.g., stored GPS information provided by the capture devices 110a-110n). Arrows 402a-402n are shown. Each of the arrows 402a-402n may correspond to one of the vehicles 400a-400n. In some embodiments, the arrows 402a-402n may indicate a direction of travel of the vehicles 400a-400n. In some embodiments, the arrows 402a-402n may indicate a direction that video is being captured by one of the capture devices 110a-110n. If a vehicle has more than one of the capture devices 110a-110n installed, multiple arrows 402a-402n may be associated with one of the vehicles 400a-400n). For example, the arrows 402a-402n may indicate a direction of the field of view of the video presently being captured by displaying a cone shaped field of view on the live view interface 308" (e.g., emulating the field of view of the video being captured by the capture devices 110a-110n).

The live view 308" may generate a live view of vehicles that may be represented by the vehicle icons 400a-400n. In some embodiments, the live view may be a real time view (or near real time). In some embodiments, the live view 308" may be a frequently updated view (e.g., static views that are updated to appear as close to real time). For example, the vehicle icons 400a-400n and/or the arrows (or field of view cones) 402a-402n may move along the map (e.g., without manually refreshing the interface). The vehicle icons 400a-400n and/or the arrows (or field of view cones) 402a-402n may move along the live view 308" to correspond with a real-world location of a vehicle. In some embodiments, the live view 308" may generate a view of locations of all drivers (e.g., data providers) at a selected time (e.g., the time range input 356 may be used to provide a date/time entry to show a snapshot of where each driver was located and/or a direction of the field of view of the corresponding capture devices 110a-110n).

In some embodiments, the vehicle icons 400a-400n may represent vehicles of data providers (e.g., based on the location of the capture devices 110a-110n). In some embodiments, the vehicle icons 400a-400n may represent a location of any vehicle based on a captured license plate. For example, one of the capture devices 110a-110n may capture a vehicle license plate, the metadata corresponding to the vehicle (e.g., the license plate, the time, the location) may be uploaded to the server 120, and the server 120 may provide the location of the vehicle based on the metadata to the app 102a to display on the live map view 308".

The subscriber user may interact with the vehicle icons 400a-400n (e.g., click, tap, long press, etc.) to receive additional information. In the example shown, a pop up box 404 is shown associated with the vehicle icon 400i. The pop up box 404 may be a graphical overlay displayed on the live view 308". The pop up box 404 may comprise a driver ID (e.g., a data provider ID, a license plate detected, etc.). The pop up box 404 may comprise a live view button 406 and/or an available video button 408.

In some embodiments, the capture devices 110a-110n may implement Wi-Fi communication. With a Wi-Fi data transfer function (or other high throughput wireless communication), the capture devices 110a-110n may be configured to stream video. The subscriber user may click on the live view button 406 and turn on a live (or near live) stream of the video recorded by the corresponding one of the capture devices 110a-110n. The app 102a may enable the subscriber user to connect to the corresponding one of the cameras 110a-110n and initiate streaming from the camera. In one example, the stream may be a live video feed having a lower resolution, lower bitrate and/or lower frame rate than video stored by the capture devices 110a-110n. In another example, the stream may be a live video feed having similar characteristics as the video stored by the capture devices 110a-110n. For example, the server 120 may set up a point-to-point connection from the data provider user to the subscriber user.

In some embodiments, the subscriber user may use the video request button 408 to view a list of available videos captured by the data provider user (e.g., based on an 'id' field of the metadata 184a-184n). In some embodiments, the subscriber user may use the video request button 408 to initiate an upload of the video over Bluetooth/Wi-Fi to the user communication device (e.g., one of the smartphones 112a-112n) when requested. The user communication device (e.g., one of the smartphones 112a-112n) may use 3G/4G/LTE/5G to upload the video to the server 120 for the subscriber user to download (e.g., a file transfer). In another example, the capture devices 110a-110n may be configured to log onto a Wi-Fi network using pre-determined credentials (e.g., pre-programmed, set up in advanced by the driver, etc.) to directly upload the video data to the network 60. For example, the capture devices 110a-110n may be configured to implement a web server capable of parsing an HTML page that requests input (e.g., credentials, a user agreement, a password, etc.) to prompt a driver to input data. In another example, the capture devices 110a-110n may be configured to negotiate seamlessly (e.g., using pre-programmed credentials) with a Wi-Fi access point to upload the video data without distracting the driver.

Since the server 120 may receive updated GPS information of each driver every few seconds, the live view 308'' may show the vehicle icons 400a-400n moving around in real time. Using the button 406, the subscriber user may have virtual eyes on the road by viewing a live stream of the recorded video (e.g., initiate real time streaming directly from the dashboard camera of the data provider user). Using the button 408, the subscriber user may see recent video from a location that the driver just passed (e.g., non-real time).

Figure 8:
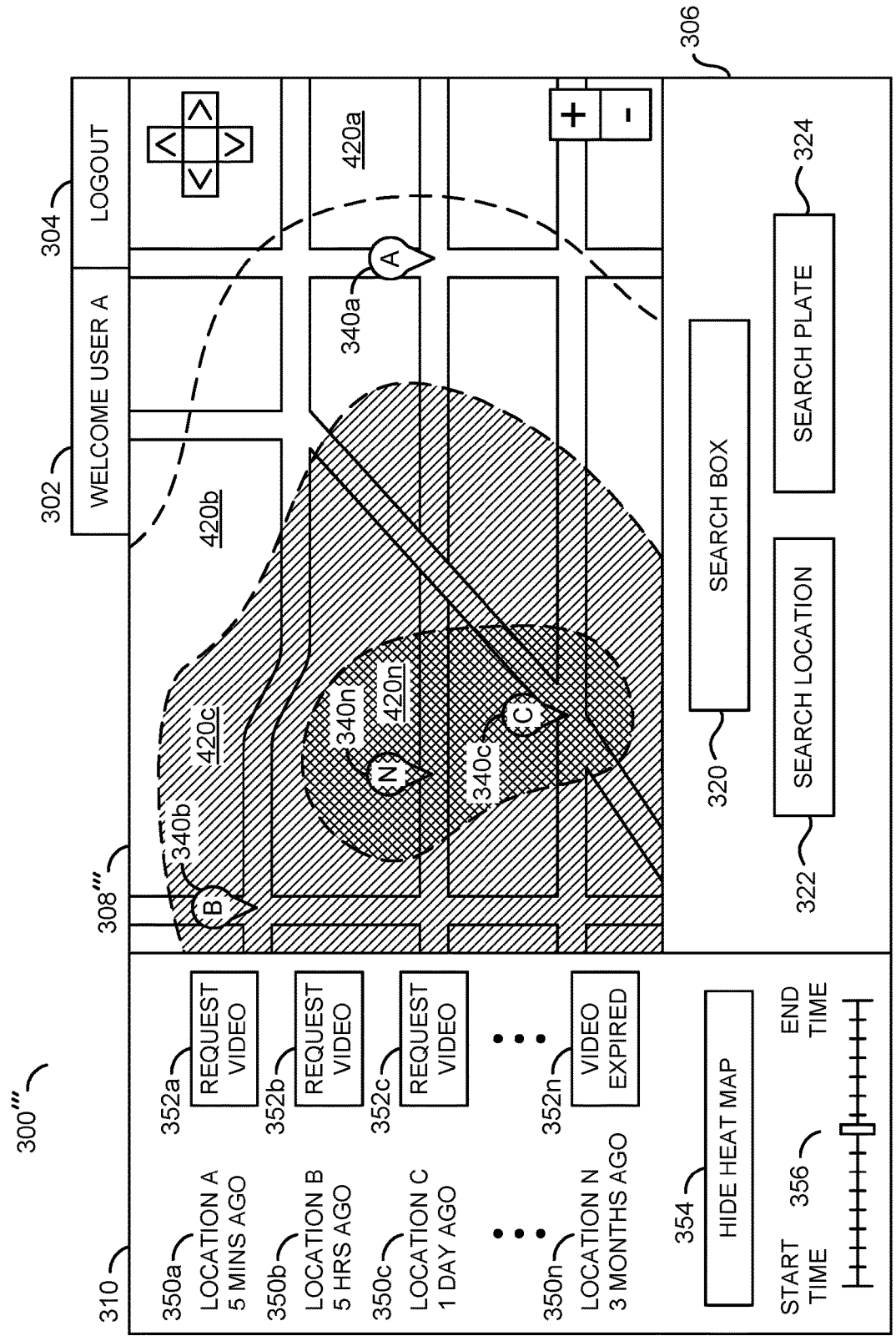
FIG. 8 is a diagram illustrating an example interface implementing a heat map.

Referring to FIG. 8, a diagram illustrating an example interface 300''' implementing a heat map is shown. The interface 300''' may have a similar implementation as described in association with FIG. 5. The interface 300''' may comprise the user greeting 302, the logout 304, the search panel 306, the heat map view 308''' and/or the results panel 310. For example, the interface 300''' may be toggled on or off when the subscriber user clicks the heat map button 354 (e.g., toggled between the map view 308 and the heat map view 308''').

The heat map view 308''' may comprise one or more regions 420a-420n. The regions 420a-420n may represent a comparative view of how often the data providers are in a particular location. For example, vehicles that follow a regular routine (e.g., driving the same path to work every morning) may result in particular locations being traveled more often. In the example shown, the region 420n may represent a highly traveled region and the region 420a may be a region that is traveled less often. The heat map view 308''' may use the regions 420a-420n to provide a better visualization of the search results to the subscriber user. In one example, the time range input 356 may move through the data points (e.g., the icons 340a-340n and/or the areas 420a-420n) to provide the subscriber user a visualization of where various vehicles were at a particular time. For example, the time range input 356 may be segmented to provide days of the week to show data points from Saturday to Sunday. For example, the time range input 356 may be implemented with a 'play' option to automatically step through time increments (e.g., minutes, hours, days of the week, etc.) to show a moving/updating visualization to the subscriber user. In another example, the time range input 356 may be a scroll bar that the subscriber user may drag to generate a visualization of where a particular vehicle is and/or where vehicles have been (e.g., during weekdays, week nights, weekends, etc.). The server 120 may also be configured to prepare a report that gives the subscriber user a sense of where a particular car was at any particular day of the week and/or time of the day.

In some embodiments, the server 120 may be configured to predict a future location of a particular driver and/or vehicle. For example, the stored data may be interpolated to determine where a driver may be on a future day. Future and/or predicted data may be used to intercept a vehicle at a future time (e.g., for law enforcement). For example, the previously stored data points (e.g., the metadata 184a-184n for one of the license plate entries 180a-180n) may indicate that a vehicle is at a particular location (e.g., a home of the driver) 80% of the time on federal holidays. The server 120 may determine a probability that the vehicle will be at the same location during an upcoming holiday. In some embodiments, additional credentials (e.g., stored in the authentication module 154) may be needed to access future vehicle location (e.g., law enforcement credentials, a warrant, etc.).

Figure 9:
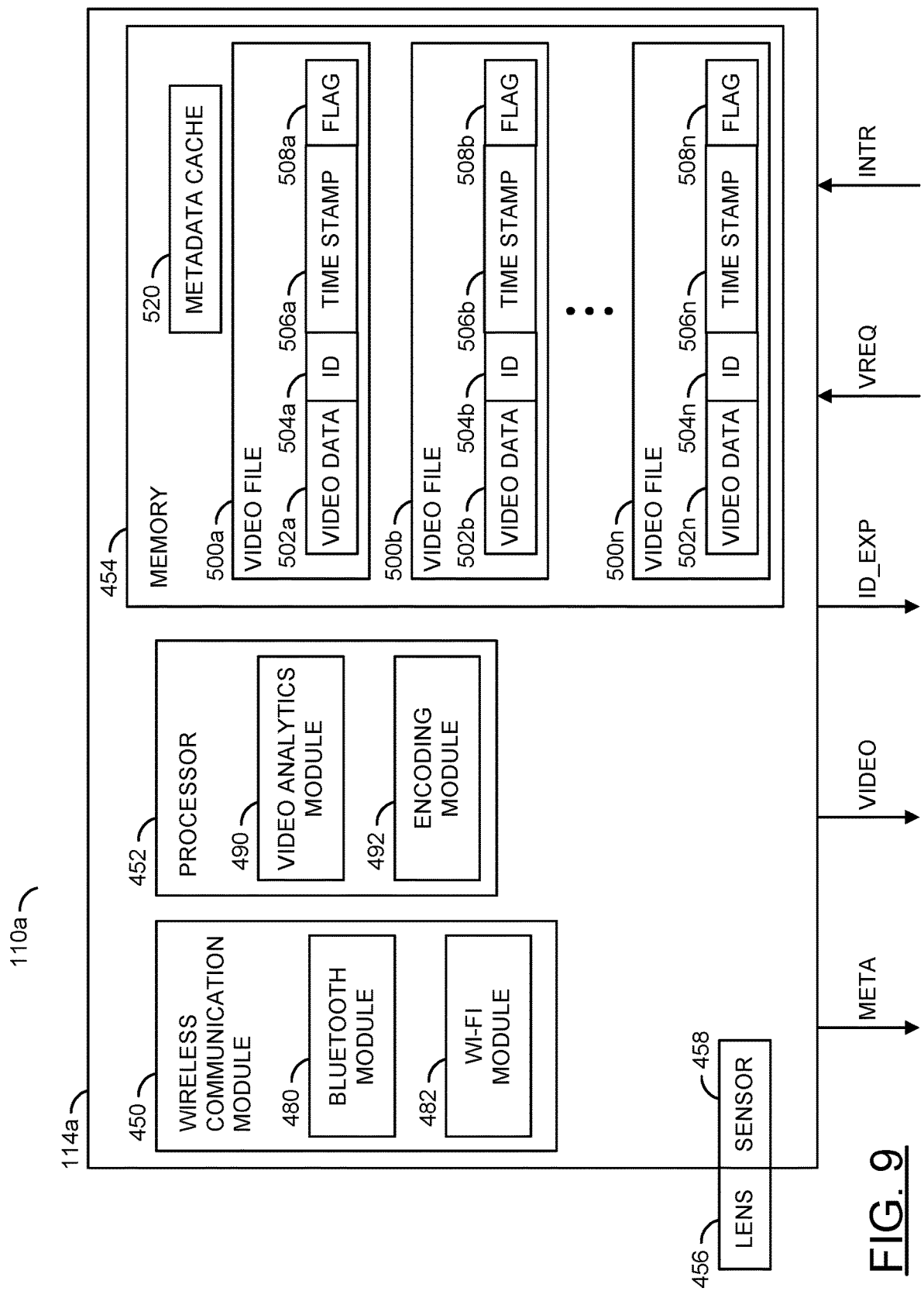
FIG. 9 is a diagram illustrating example components of a capture device.

Referring to FIG. 9, a diagram illustrating example components of the capture device 110a is shown. The capture device 110a may be a representative example of one of the capture devices 110a-110n. The capture device 110a may comprise the circuit 114a. In some embodiments, the circuit 114a may be a main printed circuit board for the capture device 110a. In some embodiments, the circuit 114a may comprise various circuit boards, daughter boards and/or modules. For example, the circuit 114a may comprise multiple printed circuit boards connected using cables. In another example, the circuit 114a may comprise input/output slots configured to connect to drop in components (e.g., off-the-shelf components). Generally, the circuit 114a may be designed to fit a space and/or heat dissipation specification for the capture device 110a.

The circuit 114a may comprise a block (or circuit) 450, a block (or circuit) 452, a block (or circuit) 454, a block (or circuit) 456 and/or a block (or circuit) 458. The block 450 may implement a wireless communication module. The block 452 may implement a processor. The block 454 may implement a memory. The block 456 may implement a lens module. The block 458 may implement a camera sensor module. The circuit 114a may comprise other components (not shown). For example, the circuit 114a may comprise a firmware, input/output ports, memory expansion slots, a battery, a power adapter (for connection to an external power supply), etc. The components of the circuit 114a may be varied according to the design criteria of a particular implementation.

The circuit 114a is shown presenting a signal (e.g., META), a signal (e.g., VIDEO) and/or a signal (e.g., ID_EXP). The circuit 114a is shown receiving a signal (e.g., VREQ) and/or a signal (e.g., INTR). The circuit 114a may present the signal META, the signal VIDEO and/or the signal ID_EXP to a corresponding one of the user communication devices 112a (e.g., a paired wireless communication device). The circuit 114a may receive the signal VREQ and/or the signal INTR from the user communication device 112a.

The wireless communication module 450 may be configured to implement one or more wireless communication protocols. The wireless communication module 450 may be configured to transmit data and/or receive data. For example, the wireless communication module 450 may enable the circuit 114a to communicate with one or more of the user communication devices 112a-112n and/or the network 60. In the example shown, the wireless communication module 450 may comprise a block (or circuit) 480 and/or a block (or circuit) 482. The block 480 may implement a Bluetooth module. The block 482 may implement a Wi-Fi module. The wireless communication module 450 may comprise other components (not shown). For example, the wireless communication module 450 may comprise a module configured to implement 3G/4G/LTE/5G communication. The implementation of the wireless communication module 450 may be varied according to the design criteria of a particular implementation.

The Bluetooth module 480 may be configured to implement Bluetooth communication. For example, the Bluetooth module 480 may be configured to pair the circuit 114a with the user communication device 112a. The Bluetooth module 480 may enable a transfer of the video data and/or the metadata from the circuit 114a to the user communication device 112a. The Bluetooth module 480 may enable a short-range and/or low-power communication.

The Wi-Fi module 482 may be configured to implement Wi-Fi communication. In some embodiments, the Wi-Fi module 482 may be configured to connect to a local and/or wide area network. In some embodiments, the Wi-Fi module 482 may be configured to create a local network and other devices (e.g., the user communication device 112a) may connect to the Wi-Fi module 482. The Wi-Fi module 482 may enable wireless communication of the video data and/or the metadata. In some embodiments, the Wi-Fi module 482 may be configured implement a mesh network with other Wi-Fi modules. For example, the Wi-Fi module 482 implemented in the capture device 110a may form a mesh network with other nearby Wi-Fi module(s) 482 in the capture devices 110b-110n. Implementing a mesh network may enable the circuits 114a-114n to communicate using an ad-hoc Wi-Fi network as vehicles move around. For example, one or more of the data provider users may have a desired connectivity to the network 60 (e.g., sufficient upload bandwidth, sufficient data quota with the service provider, an unlimited data plan, etc.). Other data provider users that do not have the desired connectivity to the network 60 may use the mesh network to utilize the connectivity to the network 60 of data provider users that do have the desired connectivity to the network 60. The mesh network may help more of the data provider users to have reliable access to the network 60.

The processor 452 may be configured to read, write and/or process data, perform calculations and/or execute computer readable instructions. The processor 452 may implement one or more processing cores to enable parallel processing. The processor 452 may be implemented using various architectures (e.g., x86/x64, ARM, etc.). In some embodiments, the processor 452 may be a Tensor processing unit configured for deep machine learning. The processor 452 may be configured to perform various types of operations (e.g., a general purpose processor). In some embodiments, the processor 452 may implement various hardware modules configured to implement specific tasks. In the example shown, the processor 452 may comprise a block (or circuit) 490 and/or a block (or circuit) 492. The block 490 may comprise a video analytics module. The block 492 may comprise an encoding module. The processor 452 may comprise other types of modules (not shown). For example, the processor 452 may further comprise an encryption module. The implementation of the processor 452 may be varied according to the design criteria of a particular implementation.

The video analytics module 490 may be configured to perform real-time video analytics on the captured video data. The video analytics module 490 may be configured to extract the metadata in response to the video analytics. The video analytics module 490 may be configured to scan visual data present in each video frame captured by the capture device 110a. In some embodiments, the video analytics module 490 may implement optical character recognition. In some embodiments, the video analytics module 490 may be configured to detect and/or classify objects detected in the video data. For example, the video analytics module 490 may compare features of the captured video frames to known features (e.g., templates) to identify an object captured in the video frame as a particular type of object (e.g., identify a vehicle as a particular make, model and year of a vehicle). The type of video analytics performed by the video analytics module 490 may be varied according to the design criteria of a particular implementation.

In some embodiments, the analytics performed by the video analytics module 490 may comprise determining characteristics of roadway features and/or objects. The metadata generated by the video analytic module 490 may be used as training data sets for machine learning. In one example, the capture devices 110a-110n may be implemented as dashboard cameras (e.g., dashcams) and the images captured may comprise various roadway data. The video analytics module 490 may analyze many images of various roadways and/or obstacles (e.g., curves, lane markings, curbs, street signs, traffic lights, license plate styles, road markings, pedestrians, vehicle types, vehicle makes, vehicle models, road hazards (e.g., snow, ice, flooding, chemical spills, etc.), construction barriers, etc.). The large amounts of metadata produced by the video analytics module 490 may provide many sample images and/or metadata of roadway data and/or object data. The data generated by the video analytics module 490 may be used to generate feature templates to improve detection when video analytics is performed (e.g., provide a greater data set to compare against). In an example, the metadata generated by the video analytics module 490 may be combined with data from other sensors (e.g., LIDAR, GPS and/or other sensors used to gather roadway data) for machine learning for autonomous driving.

The encoding module 492 may be configured to encode and/or decode the captured video data. Encoding and/or decoding the captured video may compress the video data to enable more video data to be stored in the memory 454. The encoding and/or decoding performed by the encoding module 492 may be lossless and/or lossy compression. The encoding module 492 may perform the encoding on the captured video data in real-time. For example, the encoding module 492 may implement encoding such as h.264, h.265, VP8, VP9, Daala, etc. The type of encoding implemented by the encoding module 492 may be varied according to the design criteria of a particular implementation.

The memory 454 may be configured to store data. The memory 454 may comprise a solid state memory (e.g., NAND flash). In some embodiments, the memory 454 may comprise memory onboard the circuit 114a and/or external memory (e.g., a microSD card). The memory 454 may comprise blocks (or circuits) 500a-500n and/or a block (or circuit) 520. The blocks 500a-500n may each implement storage of a video file. The block 520 may implement a metadata cache. The memory 454 may comprise other data (not shown). For example, the memory 454 may further comprise a firmware. The type of memory implemented by, the data arrangement of and/or the data stored by the memory 454 may be varied according to the design criteria of a particular implementation.

The video files 500a-500n may comprise the captured and/or recorded video. Each of the video files 500a-500n may comprise storage locations for a video clip (e.g., a discrete video recording and/or a video segment). In some embodiments, the video files 500a-500n may represent video clips having a same length (e.g., 2 minute video clips). In some embodiments, the video files 500a-500n may represent video clips (or segments) having different lengths (e.g., based on a storage size of each video file). Each video file storage location 500a-500n may comprise a corresponding one of blocks (or circuits) 502a-502n, blocks (or circuits) 504a-504n, blocks (or circuits) 506a-506n and/or blocks (or circuits) 508a-508n. The blocks 502a-502n may comprise the video data. The blocks 504a-504n may comprise the video ID. The blocks 506a-506n may comprise a time stamp. The blocks 508a-508n may comprise a flag. The video files 500a-500n may comprise other data (not shown). The type of data stored and/or the arrangement of data stored in the video files 500a-500n may be varied according to the design criteria of a particular implementation.

The video data 502a-502n may comprise the viewable captured video. The video data 502a-502n may be the data transmitted in response to a request from the subscriber user. The video data 502a-502n may be encoded by the encoding module 492 before the video files 500a-500n are created.

The video ID 504a-504n may comprise an identification for the video files 500a-500n. The video ID 504a-504n may be implemented as a data string comprising alphanumeric characters (e.g., a hash). The video ID 504a-504n may represent a portion of the metadata associated with the video files 500a-500n. The video ID 504a-504n may be used by the database 130 to locate and/or match the metadata 184a-184n to a particular one of the video files 500a-500n.

The time stamp 506a-506n may comprise an indication of when the video files 500a-500n have been recorded. The time stamp 506a-506n may comprise a data string. For example, the time stamp 506a-506n may indicate a year, a month, a date, a day of the week, an hour, a minute, seconds, fractions of a second, etc. The time stamp 506a-506n may represent a portion of the metadata associated with the video files 500a-500n. The time stamp 506a-506n may be used by the processor 452 to determine which of the video files 500a-500n is the oldest. The time stamp 506a-506n may be used by the processor 452 to determine an order that the video files 500a-500n were recorded, based on time.

The flags 508a-508n may be used to indicate whether the video file 500a-500n may be overwritten. The flags 508a-508n may represent one or more preservation bits for the video files 500a-500n. In one example, when one of the flags 508a-508n is set (e.g., to indicate the file should be preserved) by the capture devices 110a-110n, the corresponding one of the video files 500a-500n may not be overwritten. In another example, when one of the flags 508a-508n is not set (e.g., to indicate the file should not be preserved), the corresponding one of the video files 500a-500n may be made available to be overwritten (e.g., by a new video file).

In some embodiments, the flags 508a-508n may be implemented using a single bit. In some embodiments, multiple bits may be used for each of the flags 508a-508n. In one example, when using multiple bits for the flags 508a-508n, a condition for determining how long to preserve the video files 500a-500n may be set (e.g., an amount of time, a particular date, an occurrence of an event, etc.). In another example, when multiple bits are used for the flags 508a-508n, different lengths of time to preserve the video files 500a-500n may be set based on a reason for preserving the video files 500a-500n (e.g., preserve video files for 3 days if a video is the result of a subscriber search, preserve video files indefinitely if the video is evidence, preserve video files one week if an event was captured, etc.). In yet another example, when multiple bits are used for the flags 508a-508n, the bits may represent an amount of time to preserve the video files 500a-500n based on a value of a subscriber user and/or subscription tier (e.g., a subscriber user paying a higher fee may result in a value of 5 being stored for the flags 508a-508n to indicate preservation for 5 days, a subscriber user paying a lower fee may result in a value of 2 being stored for the flags 508a-508n to indicate preservation for 2 days, etc.). Generally, a user that does not have a subscription to access the database 130 (e.g., a user that is not a subscription user) may not receive search results from the database 130 (e.g., the database 130 may not generate search results and/or may not allow a search query if a user is not one of the subscriber users). In some embodiments, the processor 452 may use the flags 508a-508n to decide when to overwrite the video files 500a-500n (e.g., compare the creation date of the video files 500a-500n plus the flag value to the current date). The implementation of the flags 508a-508n may be varied according to the design criteria of a particular implementation.

The metadata cache 520 may be configured to store the metadata extracted by the video analytics module 490 and/or any other metadata corresponding to the captured video data 502a-502n. The metadata cache 520 may provide temporary storage. Generally, the metadata may not be stored long-term by the memory 454. For example, the metadata may be deleted after being successfully stored by the database 130 as the metadata 184a-184n (or the other metadata 184a'-184n'). Temporarily storing the metadata may increase an amount of the memory 454 available for storing the video files 500a-500n. Some of the metadata may be stored long-term by the memory 454 (e.g., the video ID 504a-504n and/or the time stamp 506a-506n). The metadata cache 520 may provide storage for the metadata until the metadata is uploaded to the database 130. In some embodiments, when the database 130 communicates that the metadata for a particular one of the video files 500a-500n has been successfully stored, the metadata cache 520 may purge the corresponding metadata. Generally, the metadata files may be created in the metadata cache 520, filled with metadata, compressed, encrypted, transferred to the user communication devices 112a-112n, and then deleted from the metadata cache 520 (e.g., after a confirmation of successful upload to the database 130 has been received).

The lens module 456 may be configured to focus light onto the camera sensor 458. The lens module 456 may comprise mechanisms for zooming, panning, tilting, focusing, adjusting a DC iris, etc. The camera sensor 458 may be configured to convert the light from the lens module 456 into images. The images generated by the camera sensor 458 may be the video frames of the captured video data. The video frames generated by the camera sensor 458 may be processed by the processor 452 to generate the captured video.

The signal META may comprise the data that may be stored by the database 130 as the metadata 184a-184n and/or the general metadata 184a'-184n' extracted from the captured video by the processor 452. The signal META may comprise the metadata stored by the metadata cache 520. The signal META may be generated by the metadata cache 520 and transmitted to the database 130 for storage and/or indexing. The wireless communication module 450 may implement a short-range, inexpensive and/or low power consumption communications protocol (e.g., Bluetooth) to communicate with the user communication device 112a. The user communication device 112a may forward the signal META from the circuit 114a to the network 60. The network 60 may transmit the signal META to the server 120 for storage in the database 130.

The signal VIDEO may comprise the video data 502a-502n recorded by the capture device 110a and/or the circuit 114a. The signal VIDEO may be generated by the wireless communication module 450 and transmitted to the server 120 and/or one of the subscriber devices 100a-100n. The wireless communication module 450 may implement a short-range, inexpensive and/or low power consumption communications protocol (e.g., Bluetooth) to communicate with the user communication device 112a. The user communication device 112a may forward the recorded video to the network 60.

Transmitting the video data 502a-502n to the subscriber users may be a low-priority data transfer. One of the flags 508a-508n corresponding to the video file 500a-500n being transferred may be set to ensure the video file 500a-500n is preserved at least until the data transfer is completed. Generally, the transfer of the signal VIDEO may not be initiated by the circuit 114a until the subscriber user requests the video. For example, if a user does not request a recorded video, the video file may eventually be overwritten by the capture device 110a. Since the recorded video is not transmitted until requested, unnecessary transfer and/or storage of data may be reduced.

The signal ID_EXP may comprise a notification (e.g., a flag) indicating that one of the video files 500a-500n stored by the memory 454 has expired (e.g., has been overwritten). The signal ID_EXP may comprise the video ID 504a-504n corresponding to the video files 500a-500n that has been overwritten. The capture device 110a may implement loop recording and, over time, may overwrite the video files 500a-500n (e.g., the oldest video data). The signal ID_EXP may be configured to notify the server 120 and/or the database 130 that one or more of the video files 500a-500n are no longer available. For example, the video ID 504a-504n may match a video ID stored as part of the metadata 184a-184n to create a relationship between the video files 500a-500n stored in the memory 454 and the metadata 184a-184n stored in the database 130. The signal ID_EXP may be generated by the wireless communication module 450 and transmitted to the database 130 for storage and/or indexing. For example, information transmitted by the signal ID_EXP may be stored as the expiration status flag metadata 184n in the clips 182a-182n (e.g., the metadata 184a-184n may be updated in response to the notification to indicate that the portion of the video data corresponding to the signal ID_EXP may no longer be available). When the signal ID_EXP is received and when the corresponding video is requested, the server 120 may provide metadata only instead of video in response to the request from the subscriber user.

The metadata 184a-184n stored in the database 130 may comprise the video ID 504a-504n of the corresponding video 500a-500n and/or store data used to derive the video ID 504a-504n and/or the capture device 110a-110n that stores the corresponding video file 500a-500n. For example, the metadata 184a-184n may store the time stamp 506a-506n (e.g., when the first entry is inserted to the video files 500a-500n), a user ID (e.g., to identify the user communication device 112a-112n corresponding to the capture device 110a-110n that captured the corresponding video files 500a-500n), a sequence number (e.g., a sequential number incrementing from 0 to 9999 and then looping back to 0). In one example, the metadata 184a-184n may be a filed named "DATA-2017-03-07-14-30-00-00-01-0099.txt" (e.g., corresponding to the first timestamp and/or GPS entry deposited Mar. 7, 2017 at 2:30:00 PM by Driver ID #0001 and a sequence number of video file 0099). The contents of the file for the metadata 184a-184n may comprise a sequence of lines of data. Each line of data may comprise at least a time stamp entry, a latitude and/or a longitude (e.g., 2017-03-07 14:30:00, 37.804440, −122.422874, 2017-03-07 14:30:20, 37.804440, −122.422874, etc.). Some lines of data may comprise a video file name and/or status of the video file (e.g., FILE DELETED: VIDEO-2017-03-06-14-30-00-0001-0022.MP4, FILE CREATED: VIDEO-2017-03-07-14-31-40-0001-0052.MP4, etc.). The video file names of the metadata 184a-184n may correspond with the names of the video files 500a-500n. The format of the metadata 184a-184n stored in the database 130 may be varied according to the design criteria of a particular implementation.

The signal VREQ may comprise a request to the capture device 110a configured to initiate an upload of one of the video files 500a-500n stored in the memory 454. For example, the transfer of the signal VIDEO may be initiated in response to the processor 452 receiving the signal VREQ. The signal VREQ may be generated by one of the subscriber devices 100a-100n. The signal VREQ may be generated in response to the subscriber user requesting a particular recorded video data clip. For example, the subscriber user may perform a search of the database 130 and receive a list of results based on the stored metadata. If the subscriber user does not request a video file (e.g., no signal VREQ received), the wireless communication module 450 may not upload video data. If the subscriber user does request one of the stored video files 500a-500n, the subscriber device (e.g., 100a) may generate the signal VREQ. The server 120 may determine which of the capture devices 110a-110n has the requested video file 500a-500n (e.g., based on the video list 172a and/or the device ID of the clip stored as part of the metadata 184a-184n). The server 120 may transmit the signal VREQ to the network 60, to the corresponding user communication device (e.g., 112a) and then to the corresponding capture device 110a. In response to the signal VREQ, the server 120 may make the requested video file available to the subscriber user.

The signal INTR may comprise an interrupt request for the capture device 110a. The interrupt request communicated by the signal INTR may be configured to provide various instructions to the processor 452. In one example, the interrupt request may be used to initiate a live streaming mode for the capture device 110a. In a live streaming mode, the signal VIDEO may be streamed as a high priority data transfer (e.g., the capture device 110a may communicate with the server 120 without using the user communication device 112a). In another example, the interrupt request may be used to initiate video storage mode (e.g., record video as a loop recording). In still another example, the signal INTR may be transmitted to stop the capture device 110a from recording. In yet another example, the signal INTR may be transmitted to check if one or more of the video files 500a-500n are available and/or unavailable (e.g., check if information stored in the database 130 is consistent). Generally, the signal INTR is implemented to provide the processor 452 with a particular instruction to execute at a particular time (e.g., to cause the capture device 110a to change behavior on demand). The type of instructions transmitted as interrupt requests by the signal INTR may be varied according to the design criteria of a particular implementation.

The signal INTR may be transmitted to indicate that a particular one of the stored video files 500a-500n should be preserved. For example, one of the video files 500a-500n should be preserved when the video recording is an output result of a search request by one of the subscriber users. The database 130 may be configured to generate search results for a subscriber user based on the metadata 184a-184n (e.g., in response to a search query submitted using the app 102a). The search results determined by the database 130 may correspond to one or more of the video files 500a-500n (e.g., based on the video IDs stored as part of the metadata 184a-184n). The database 130 may generate the signal INTR to preserve the video files 500a-500n that correspond to the search results. The database 130 may provide the signal INTR to one or more of the capture devices 110a-110n (e.g., by communicating with a corresponding one of the user communication devices 112a-112n) based on the search results (e.g., the metadata 184a-184n may indicate which of the capture devices 110a-110n captured a particular video file and/or which of the user communication devices 112a-112n is associated with the capture devices 110a-110n that captured the particular video file).

The signal INTR may comprise one or more of the video IDs 504a-504n. The processor 452 may match the data in the signal INTR to the video IDs 504a-504n. The processor 452 may set the flags 508a-508n corresponding to the video files 500a-500n with the matching video IDs 504a-504n. The video files 500a-500n may be preserved in response to the signal INTR.

The processor 452 may be configured to receive captured images from the sensor 458, perform video analytics using the video analytics module 490 to extract the metadata, encode the captured video using the encoding module 492 and/or store the encoded video data as the video files 500a-500n in the memory 454. The video files 500a-500n may be created in the memory 454 to implement a loop recording. The loop recording implementation may create new video files 500a-500n in available (e.g., free) space in the memory 454. For example, if the memory 454 has free space available, the newest encoded video data may be stored in the free space of the memory 454 (e.g., previously stored data may not be overwritten). When the memory 454 is filled (e.g., stored to capacity), the memory 454 may overwrite previously stored data with the new data.

Generally, a loop recording default storage implementation may overwrite the oldest data (e.g., the video files 500a-500n having the oldest/lowest time stamp 506a-506n) first. For example, if the video file 500a is written into the memory 454 first and the video file 500i is written into the last of the available free space (e.g., video files 500a-500i take up all the available free space), then the next video file 500j may overwrite the video file 500a (e.g., and subsequently the video files 500b, 500c, etc. may be overwritten by new video data). The loop recording default storage implementation may enable the video files 500a-500n to be stored in the memory 454 as portions of a continuous recording (e.g., video may be continuously captured as the vehicle 200 is being driven and the video files 500a-500n may be the continuous video segmented into shorter clips).

The flags 508a-508n may be configured to override the loop recording default storage implementation. The flags 508a-508n may indicate that one or more of the video files 500a-500n should be preserved even if the video file would be the next (e.g., oldest) file to be overwritten in the loop recording default storage implementation. For example, if the video file 500a is written into the memory 454 first and the flag 508a is set, the video file 500b is written into the memory 454 second and the flag 508b is not set and the video file 500i is written into the last of the available free space (e.g., video files 500a-500i take up all the available free space), then the next video file 500j may overwrite the video file 500b instead of the video file 500a (e.g., and subsequently the video files 500c, 500d, etc. may be overwritten unless a respective one of the flags 508a-508n has been set). Generally, the processor 452 may store the next portion of the captured video (e.g., the newest created video file 500a-500n) in an empty storage location of the memory 454 when free space is available (e.g., one or more storage locations of the memory 454 are empty), and in one of the storage locations of the memory 454 that stores the oldest portion of the captured video (e.g., overwrite one of the video files 500a-500n having the oldest time stamp 506a-506n) that does not have the flag 508a-508n set if there are no empty storage locations in the memory 454.

The flags 508a-508n may be modified to enable the video files 500a-500n to be preserved in case that one of the subscriber users decides to request one of the video files 500a-500n. The flags 508a-508n may be implemented to strike a balance between preserving the video files 500a-500n that may be potentially requested, and ensuring that the memory 454 may have space available for recording new video files 500a-500n.

In some embodiments, the flags 508a-508n may be set to preserve a corresponding one of the video files 500a-500n when the database 130 selects the corresponding one of the video clips 182a-182n as the search result(s) in response to a search query from the subscriber users (e.g., sent using the app 102a on the subscriber devices 100a-100n). For example, from the search results of the query, the database 130 may identify the video ID(s) and/or the ID of the capture device(s) 110a-110n for the video clips 182a-182n based on the metadata 184a-184n. The database 130 may transmit the signal INTR to the capture device(s) 110a-110n corresponding to the ID of the capture device stored in the metadata 184a-184n. The signal INTR may identify the video IDs 504a-504n corresponding to the search result. When the signal INTR is received by the corresponding one of the circuits 114a-114n, the processor 452 may match the video IDs 504a-504n with the video files 500a-500n stored in the memory 454 and set (e.g., modify) the corresponding one of the flags 508a-508n to preserve the video. The flags 508a-508n may be set to preserve the video files 500a-500n when the metadata 184a-184n corresponds to the search result determined by the database 130 (e.g., a request for the video files 500a-500n may not be needed for preservation). By preserving the video files 500a-500n in response to a match to a search query by the subscriber user, the system 50 may preserve the video files 500a-500n in the event that the subscriber user later decides to request the video file (e.g., the corresponding video file 500a-500n may be available when the signal VREQ is received). In some embodiments, the preserved video files 500a-500n may not be requested and to prevent any unnecessary use of data (e.g., data usage limits imposed by internet and/or cellular communication providers) the signal VIDEO may not be uploaded until formally requested by the subscriber user. The video files 500a-500n may be requested by the subscriber users using the app 102a.

In some embodiments, the flags 508a-508n may be set to preserve a corresponding one of the video files 500a-500n when an event has been determined to have occurred within a range of the capture devices 110a-110n. When an event has been determined to occur (e.g., a pre-scheduled notification to the system 50, a notification from police, a notification from news reporters, notifications from insurance investigators, etc.), the location and/or a time may be presented to the database 130 (e.g., similar to a search query from the subscriber users). In an example, when the event is pre-scheduled, the processor 452 may store the recorded video files 500a-500n that correspond to the event with the flags 508a-508n set to preserve. In another example, when the event is determined after the event has occurred, the database 130 may search the metadata 184a-184n to determine the clips 182a-182n that match the event (e.g., a location, a time, a person of interest, a vehicle of interest, etc.). When the clips 182a-182n that match the event are found, the database 130 may find the video ID and/or the ID of the capture devices 110a-110n that potentially captured the event. The signal INTR may be sent to the capture devices 110a-110n that potentially captured the event, and the flags 508a-508n may be modified (e.g., set) for the video files 500a-500n that match the video IDs 504a-504n of the signal INTR. The flags 508a-508n may be set to preserve the video files 500a-500n when the metadata 184a-184n corresponds to the event, even if the video has not been requested. By preserving the video files 500a-500n in response to a match of the event, the system 50 may preserve the video files 500a-500n in case that the video files 500a-500n are requested later.

Generally, the signal INTR may be sent to the capture devices 110a-110n to preserve the video files 500a-500n that have been captured within a range of the event by modifying the flags 508a-508n. In some embodiments, the range of the event may correspond to location coordinates and/or a time. When an event occurs, a notification may be sent (e.g., the signal INTR) to all capture devices 110a-110n storing video files 500a-500n with GPS tags (e.g., the metadata 184a-184n) within the bounds of the locality where the event occurred. In one example, the event may be a person of interest (e.g., a wanted criminal, a missing person, a celebrity, etc.). In another example, the event may be a crime (e.g., a stolen vehicle, a shooting, an explosion, etc.). In yet another example, the event may be a natural phenomenon (e.g., an eclipse, extreme weather such as a hurricane, flooding, lightning, etc.). In still another example, the event may be a something known in advance (e.g., a parade, a ceremony, a celebration, a sports competition, etc.) and/or something not known ahead of time (e.g., an accident, an incident, a calamity, a catastrophe, a mishap, a phenomenon, etc.).

In some embodiments, the event may be conditions used for machine learning for autonomous driving (e.g., deep learning). For example, to provide training data for machine learning, particular situations, environments and/or circumstances may need to be analyzed. The processor 452 may be configured to identify particular situations, environments and/or circumstances. For example, if more training data is requested for blizzard (or flooding, or hail) conditions, the event may be when there is a blizzard (or flood, or hail) outside. In another example, if more training data is requested for identifying a type of animal, the event may be when an animal is detected. In yet another example, if more training data is requested for particular types of roadways, the event may be when pre-determined road conditions are detected. The conditions for an event may be varied according to the design criteria of a particular implementation.

When the flags 508a-508n are modified to preserve the video files 500a-500n, the video files 500a-500n may be preserved for a pre-determined amount of time. For example, when the flags 500a-500n are implemented as a single bit, the single bit may represent the pre-determined amount of time (e.g., one week). In another example, when the flags 500a-500n are implemented as multiple bits, the multiple bits may represent an amount of time to preserve the video (e.g., the bits may be encoded to represent time). Limiting the amount of time that the video files 500a-500n may be preserved may ensure that memory space is available for recording new video data (e.g., if too many videos are preserved, new videos may not be recorded). Limiting the amount of time that the video files 500a-500n may be preserved may prevent against malicious attacks and/or spam bots (e.g., prevent attacks that request all videos to prevent new data from being recorded).

In some embodiments, the pre-determined amount of time for preserving the video files 500a-500n may be configured to comply with local legislation. For example, privacy laws may limit data retention. In some embodiments, the processor 452 may determine a location of the capture device 110 and adjust the length of time for preservation based on the legislation of the region. The pre-determined amount of time for preserving the video files 500a-500n may be configured to be updated. For example, as legislation is adjusted, introduced and/or repealed and/or new court decisions are provided, the pre-determined amount of time may be updated to comply with the latest legislation. The pre-determined amount of time may be varied according to the design criteria of a particular implementation. In some embodiments, the video files 500a-500n and/or the metadata 184a-184n may be purged to comply with the law. In some embodiments, the video files 500a-500n may have a default amount of time set to purge the data from the memory 454. The default amount of time to purge the data may be selected arbitrarily and/or based on the design criteria of a particular implementation.

In some embodiments, the signal INTR to preserve one or more of the video files 500a-500n may be received by the user communication device 112a-112n of the driver when the driver is not operating the vehicle (e.g., the capture device 110a-110n may not be powered on and/or communicating). The interrupt signal INTR may be queued by the user communication device 112a-112n (e.g., stored in memory) and transmitted to the capture device 110a-110n when the two units (e.g., the capture device 110a-110n and/or the user communication device 112a-112n) are both powered up and in proximity of each other. For example, there may be a delay between the database 130 sending the interrupt signal INTR and the capture devices 110a-110n receiving the information to preserve the video files 500a-500n. Generally, the capture device 110a-110n may not be in operation without a paired user communication device 112a-112n companion and data may not be overwritten.

In some embodiments, the system 50 may be implemented to aid in one or more of asset recovery (e.g., locating an asset with a large number of GPS data points from the metadata 184a-184n), roadway investigation (e.g., video evidence for post mortem analysis of roadway events), motor vehicle theft (e.g., real time location of stolen vehicles), locating a person of interest and/or providing roadway video for deep learning and autonomous driving training. In an example, when locating a person of interest, a person may be located based on a large number of GPS data points (e.g., the metadata 184a-184n) corresponding to the vehicle of the person of interest (e.g., often individuals are within 1000 feet of the vehicle the individual drives). In an example of providing roadway video, self-driving car developers train algorithms (e.g., for deep learning) by collecting video and/or sensor streams of various scenarios and then annotate the streams (e.g., manually and/or automatically outlining and labeling various objects in each frame). In another example of providing roadway video data, an event recorded in the video files 500a-500n may comprise a particular road and/or weather type (e.g., the event may be defined as a hail storm that occurs within city boundaries, approaching a traffic signal during night, etc.). In some embodiments, the video analytics module 490 may have the ability to distinguish objects and the database 130 may be searched for video streams with particular characteristics (e.g., the hail storm). The hail storm may only last a few minutes, but assuming a large number of drivers are collecting data during the hail storm event, there may be a significant number of video streams available for download that match the criteria of a hail storm.

Figure 10:
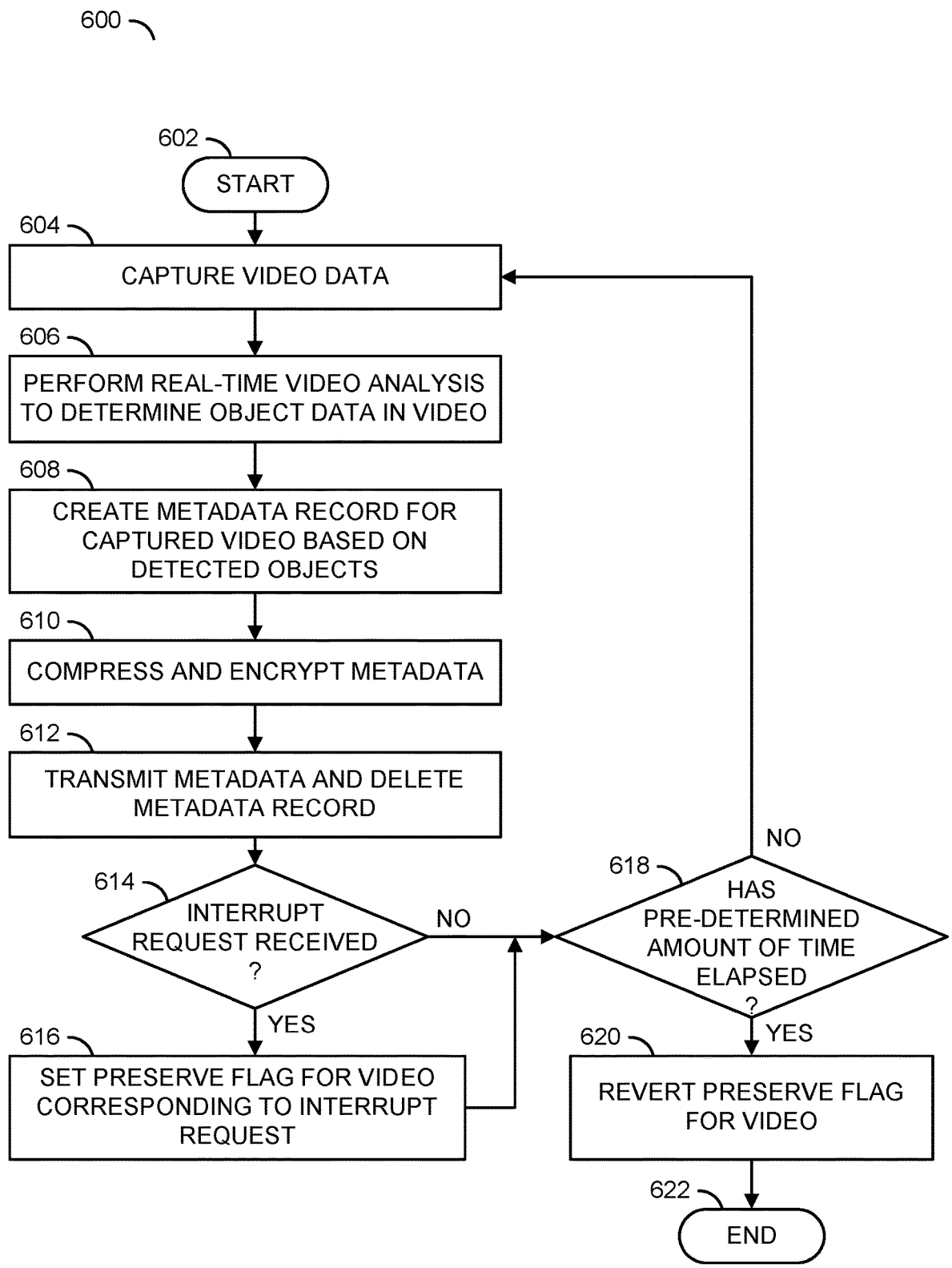
FIG. 10 is a flow diagram illustrating a method for modifying a preserve flag in response to an interrupt request.

Referring to FIG. 10, a method (or process) 600 is shown. The method 600 may modify one of the preserve flags 508a-508n in response to the interrupt request signal INTR. The method 600 generally comprises a step (or state) 602, a step (or state) 604, a step (or state) 606, a step (or state) 608, a step (or state) 610, a step (or state) 612, a decision step (or state) 614, a step (or state) 616, a decision step (or state) 618, a step (or state) 620, and a step (or state) 622.

The state 602 may start the method 602. In the state 604, the circuits 114a-114n may capture video data. For example, the lens 456 may focus light onto the sensor 458, the sensor 458 may transform the light data into computer readable video frame data and the processor 452 may create the video data 502a-502n from the video frames. The video data 502a-502n may be stored as part of the video files 500a-500n in the memory 454. Next, in the state 606, the video analytics module 490 may perform real-time video analysis to determine object data in the captured video. In the state 608, the video analytics module 490 may create metadata records for the captured video based on the detected objects in the video data 502a-502n. Next, in the state 610, the processor 452 may compress and/or encrypt the metadata. For example, the metadata may be stored in the metadata cache 520. In the state 612, the wireless communication module 450 may transmit the metadata from the metadata cache 520 (e.g., the signal META) to one or more of the user communication devices 112a-112n and/or the processor 452 may delete the metadata record from the metadata cache 520. Next, the method 600 may move to the decision state 614.

In the decision state 614, the processor 452 may determine whether the interrupt signal INTR has been received (e.g., from one of the user communication devices 112a-112n). If the signal INTR has not been received, the method 600 may move to the decision state 618. If the signal INTR has been received, the method 600 may move to the state 616. In the state 616, the processor 452 may set (e.g., modify) one or more of the preserve flags 508a-508n for the video files 500a-500n corresponding to (e.g., identified by) the interrupt request signal INTR. For example, the signal INTR may comprise data indicating which of the video files 500a-500n to preserve based on the video IDs 504a-504n. Next, the method 600 may move to the decision state 618.

In the decision state 618, the processor 452 may determine whether a pre-determined amount of time has elapsed. If the pre-determined amount of time has not elapsed, the method 600 may return to the state 604. If the pre-determined amount of time has elapsed, the method 600 may move to the state 620. In the state 620, the processor 452 may revert one or more of the flags 508a-508n. Next, the method 600 may move to the state 622. The state 622 may end the method 600.

Figure 11:
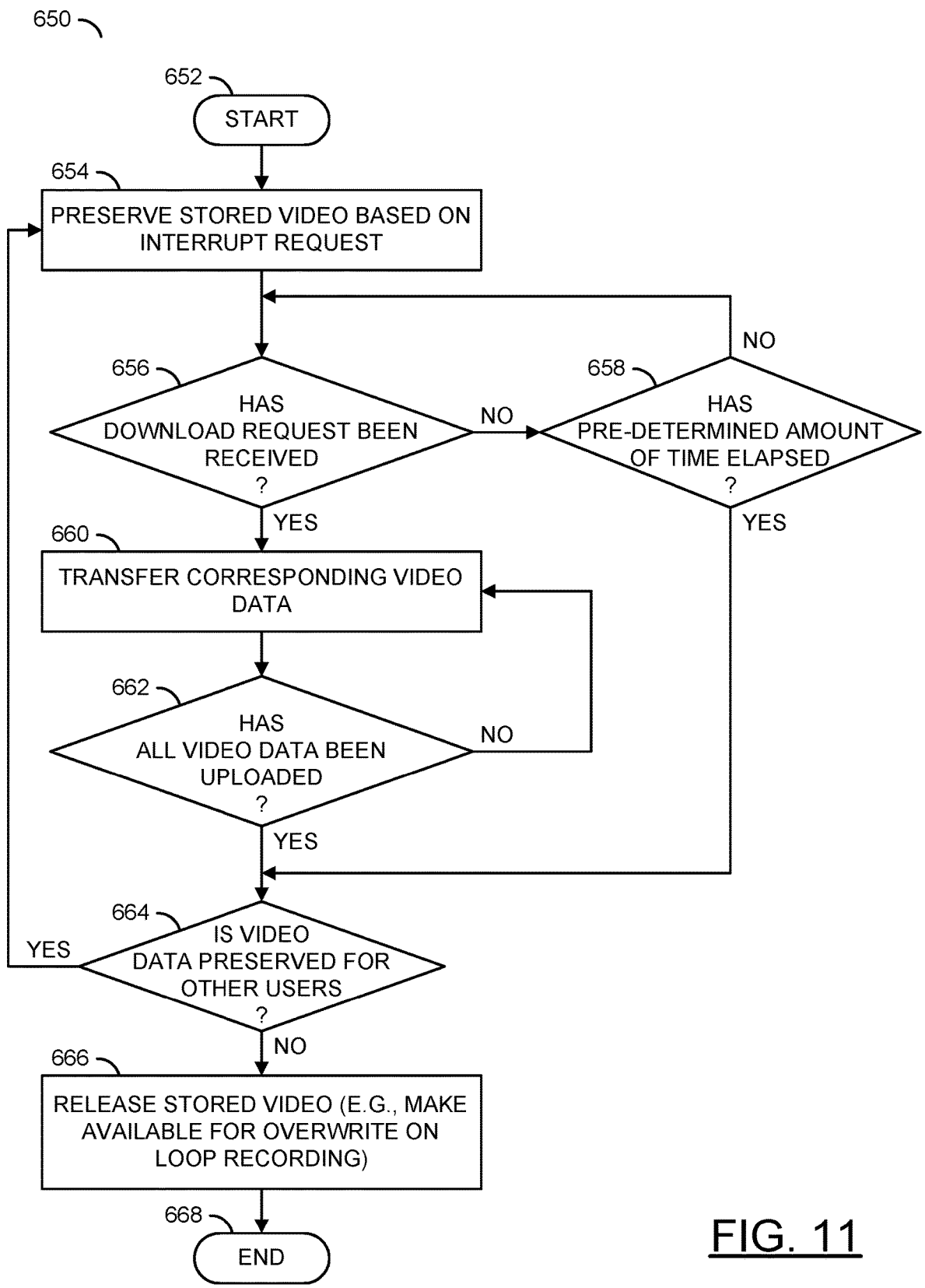
FIG. 11 is a flow diagram illustrating a method for releasing a video file after video data has been uploaded.

The preserve flags 508a-508n may each have a separate, pre-determined amount of time to indicate that the corresponding video files 500a-500n should be preserved. In some embodiments, the processor 452 may track different timers for each of the flags 508a-508n to determine when to revert the flags 508a-508n (e.g., to indicate that the video files 500a-500n may be released from the memory 454). In some embodiments, the flags 508a-508n may comprise bits to indicate a time to revert to a state to indicate that the corresponding one of the video files 500a-500n may be released. In one example, a first interrupt signal INTR may indicate that the video file 500b should be preserved and a second interrupt signal INTR may arrive later to indicate that the video file 500a should be preserved. The pre-determined amount of time to preserve the video file 500b may be tracked independently from the pre-determined amount of time to preserve the video file 500a. For example, when the pre-determined amount of time to preserve the video file 500b elapses, the flag 508b may revert, and the pre-determined amount of time to preserve the video file 500a may continue tracking how long to preserve the video file 500a. The method for tracking the amount of time to preserve the video files 500a-500n before reverting the flags 508a-508n may be varied according to the design criteria of a particular implementation. Referring to FIG. 11, a method (or process) 650 is shown.

The method 650 may release one or more of the video files 500a-500n after the video data 502a-502n has been uploaded. The method 650 generally comprises a step (or state) 652, a step (or state) 654, a decision step (or state) 656, a decision step (or state) 658, a step (or state) 660, a decision step (or state) 662, a decision step (or state) 664, a step (or state) 666, and a step (or state) 668.

The state 652 may start the method 650. In the state 654, the processor 452 may preserve the stored video files 500a-500n based on the interrupt request signal(s) INTR (e.g., the status of the flags 508a-508n). Next, the method 650 may move to the decision state 656. In the decision state 656, the processor 452 may determine whether the download request signal VREQ has been received. If the download request signal VREQ has been received, the method 650 may move to the state 660. If the download request signal VREQ has not been received, the method 650 may move to the decision state 658.

In the decision state 658, the processor 452 may determine whether the pre-determined amount of time has elapsed (e.g., for reverting one or more of the flags 508a-508n). If the pre-determined amount of time has not elapsed, the method 650 may return to the state 656. If the pre-determined amount of time has elapsed, the method 650 may move to the decision state 664.

In the state 660, the wireless communication module 450 may transfer the corresponding video data in the signal VIDEO (e.g., one or more of the video files 500a-500n corresponding to the video request signal VREQ) to one or more of the user communication devices 112a-112n. Next, the method 650 may move to the decision state 662. In the decision state 662, the processor 452 may determine whether all the video data 502a-502n for the video files 500a-500n identified in the signal VREQ has been uploaded. If all the video data 502a-502n has not been uploaded, the method 650 may return to the state 660. If all the video data 502a-502n has been uploaded, the method 650 may move to the decision state 664.

In the decision state 664, the processor 452 may determine whether the video data corresponding to the video request signal VREQ is preserved for other users. For example, multiple subscriber users may have performed a search query with search results that have one or more video files 500a-500n in common. In another example, the video data corresponding to the signal VREQ may be preserved because of event parameters. In some embodiments, the flags 508a-508n may indicate that the video files 500a-500n are preserved for more than one subscriber user (e.g., the video files 500a-500n may not be released until all subscriber users that may want the video file have had a chance to download the video data). If the video data is preserved for other users, the method 650 may return to the state 654. If the video data is not preserved for other users, the method 650 may move to the state 666. In the state 666, the processor 452 may release the stored video files 500a-500n (e.g., make the video files 500a-500n available to be overwritten in the loop recording process). For example, the flags 508a-508n may be reverted to indicate not to preserve the corresponding video files 500a-500n. Next, the method 650 may move to the state 668. The state 668 may end the method 650.

In some embodiments, the flags 508a-508n may be configured to indicate that the corresponding video files 500a-500n should be preserved for more than one of the subscriber users (e.g., multiple search results produced by the database 130 correspond to one of the video files 500a-500n). The capture devices 110a-110n may be configured to preserve the video files 500a-500n to enable each of the subscriber users that have received a search result that includes a particular one of the video files 500a-500n to have a pre-determined amount of time to request one of the video files 500a-500n.

In an example, the video file 500i may be a search result for three different subscriber users, and the flag 508i may be modified to preserve the video file 500i for 7 days. When one of the subscriber users requests the video file 500i, the signal VREQ may be transmitted to the corresponding user communication device and/or the corresponding capture device (e.g., the user communication device 112c and/or the capture device 110c). In some embodiments, the system 50 may implement peer-to-peer sharing. For example, the video file 500i may be stored by the user communication device 112c and uploaded to a first subscriber user that requests the video file 500i. If a second subscriber user requests the video file 500i (e.g., within the 7 day window for preserving the video file 500i), the user communication device 112c may initiate an upload of the video file 500i to the second subscriber user (e.g., initiate another upload). In another example, the second subscriber user that requests the video file 500i may receive portions of the video file 500i from both the first subscriber user and the data provider user. Implementing peer-to-peer transfers of the video files 500a-500n may reduce an amount of resources utilized by the server 120. In some embodiments, the server 120 may store the uploaded video (e.g., provide centralized storage). For example, the video file 500i may be uploaded to the server 120 in response to the signal VREQ. When the video file 500i has been uploaded to the server 120, the video file 500i may be deleted from the user device 112c. Each of the subscriber users that requested the video file 500i may download the video file 500i from the server 120. By uploading the video files 500i to the server 120, the data provider user may not upload the video file 500i multiple times.

Figure 12:
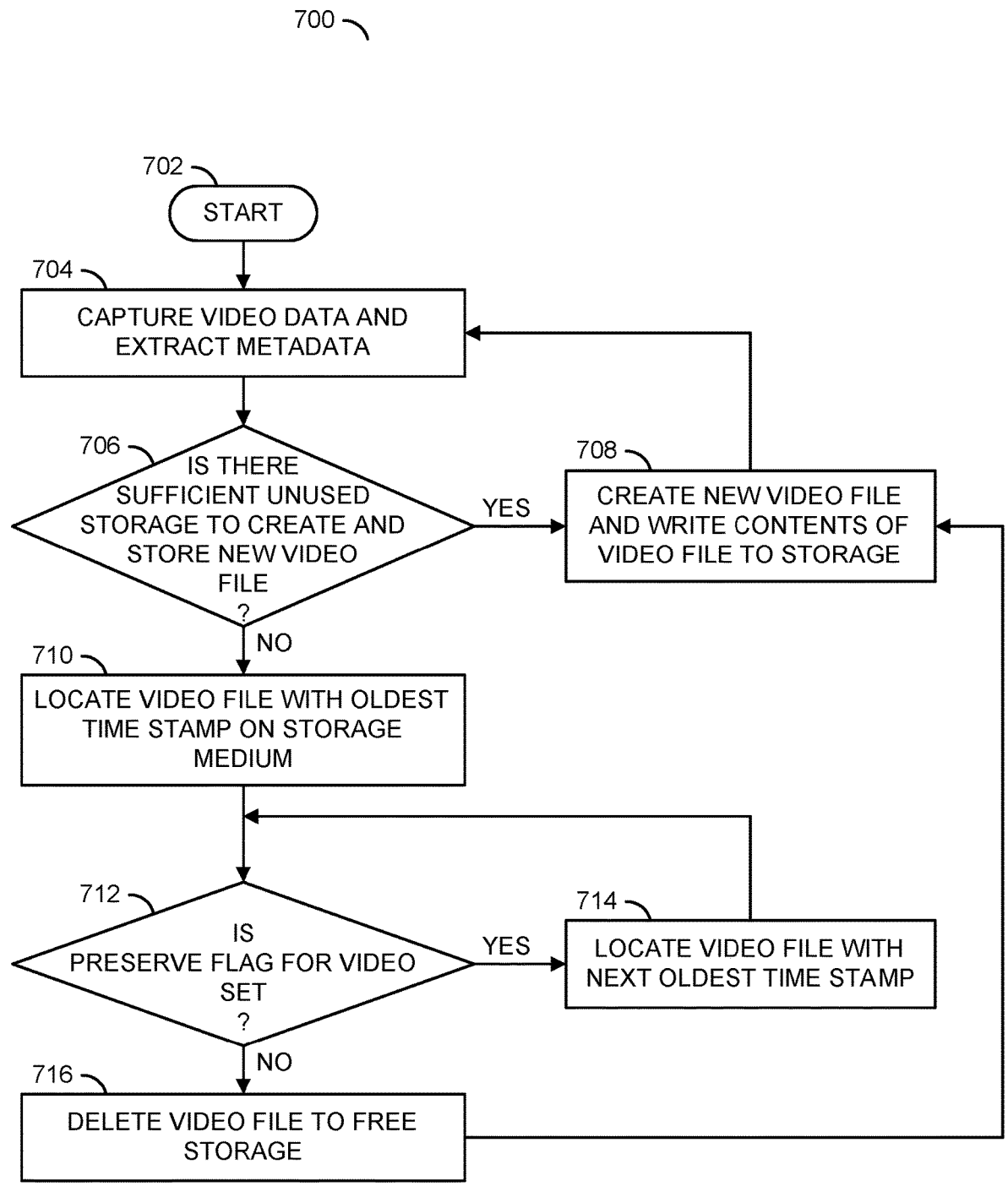
FIG. 12 is a flow diagram illustrating a method for preserving video in a loop recording when a preserve flag is set.

Referring to FIG. 12, a method (or process) 700 is shown. The method 700 may preserve the video files 500a-500n in a loop recording when the preserve flags 500a-500n are set. The method 700 generally comprises a step (or state) 702, a step (or state) 704, a decision step (or state) 706, a step (or state) 708, a step (or state) 710, a decision step (or state) 712, a step (or state) 714, and a step (or state) 716.

The state 702 may start the method 700. In the state 704, the processor 452 (e.g., the video analytics module 490 and/or the encoding module 492) may capture the video files 500a-500n and/or extract the metadata. Next, the method 700 may move to the decision state 706. In the decision state 706, the memory 454 may determine whether there is sufficient unused storage to create and store a new video file. If there is not sufficient unused storage, the method 700 may move to the state 710. If there is sufficient unused storage, the method 700 may move to the state 708. In the state 708, the processor 452 may create a new one of the video files 500a-500n and write the contents of the new video file to storage in the memory 454. Next, the method 700 may return to the state 704.

In the state 710, the processor 452 may locate one of the video files 500a-500n with the oldest time stamp (e.g., based on the time stamps 506a-506n) on the storage medium 454. Next, the method 700 may move to the decision state 712. In the decision state 712, the processor 452 may determine whether the preserve flag 508a-508n corresponding to the video file 500a-500n is set (e.g., to indicate that the video file should be preserved). If the preserve flag is set, the method 700 may move to the state 714. In the state 714, the processor 452 may locate one of the video files 500a-500n with the next oldest time stamp 506a-506n. Next, the method 700 may return to the decision state 712. In the decision state 712, if the preserve flag is not set, the method 700 may move to the state 716. In the state 716, the processor 452 may delete the video file from the memory 454 in order to free storage. Next, the method 700 may move to the state 708.

Figure 13:
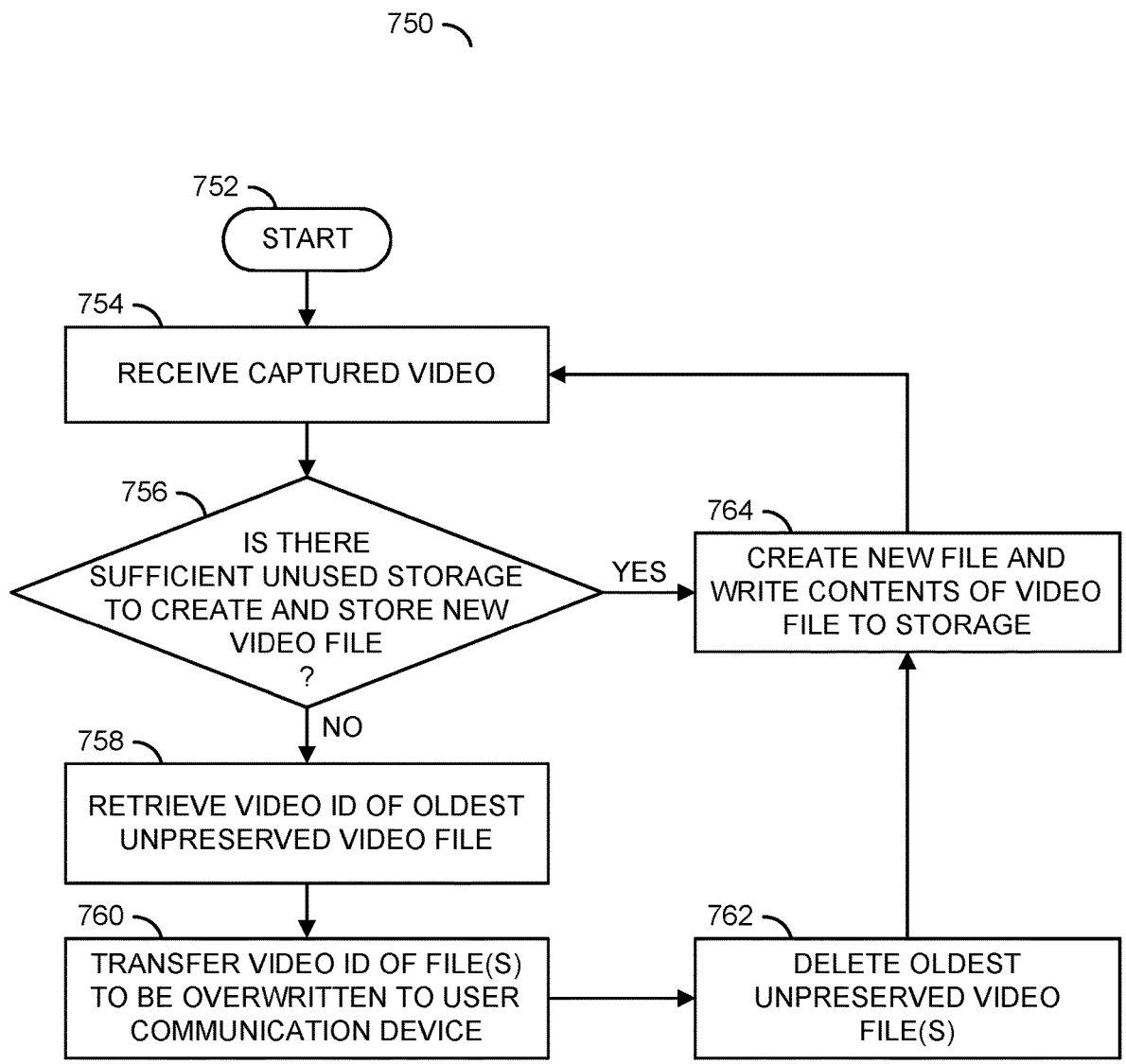
FIG. 13 is a flow diagram illustrating a method for creating a new video file in a loop recording.

Referring to FIG. 13, a method (or process) 750 is shown. The method 750 may create a new video file in a loop recording. The method 750 generally comprises a step (or state) 752, a step (or state) 754, a decision step (or state) 756, a step (or state) 758, a step (or state) 760, a step (or state) 762, and a step (or state) 764.

The state 750 may start the method 752. In the state 754, the memory 454 may receive the captured video files 500a-500n. Next, the method 750 may move to the decision state 756. In the decision state 756, the memory 454 may determine whether there is sufficient unused storage to create and store a new video file. If there is sufficient storage space, the method 750 may move to the state 764. In the state 764, the processor 452 may create a new one of the video files 500a-500n and write the contents of the new video file to storage in the memory 454. Next, the method 750 may return to the state 754. In the decision state 756, if there is not sufficient storage space, the method 750 may move to the state 758.

In the state 758, the processor 452 may retrieve the video ID 504a-504n corresponding to the oldest video file 500a-

500*n* that does not have the preserve flag 508*a*-508*n* set (e.g., the video file to be overwritten). Next, in the state 760, the wireless communication module 450 may transfer the video ID(s) 504*a*-504*n* corresponding to the video files 500*a*-500*n* to be overwritten to the user communication device(s) 112*a*-112*n* (e.g., transfer the signal ID_EXP). For example, the user communication devices(s) may transmit the signal ID_EXP to indicate to the database 130 that the video file 500*a*-500*n* is no longer available and the database 130 may update the corresponding metadata 184*a*-184*n*. Next, in the state 762, the processor 452 may delete the oldest video file(s) 500*a*-500*n* that have not been preserved (e.g., video files that are available to be released from the memory 454). Next, the method 750 may move to the state 764.

Figure 14:
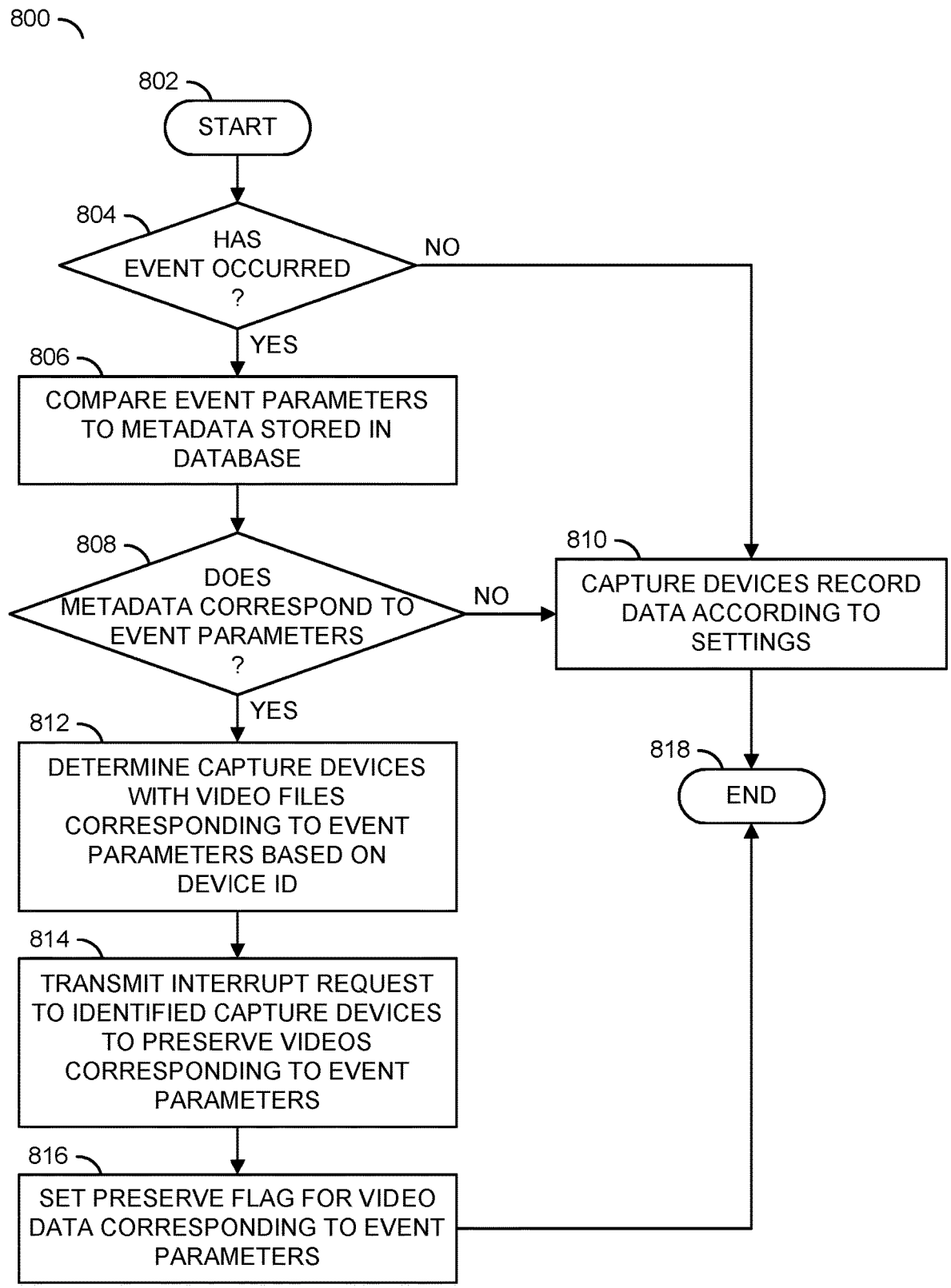
FIG. 14 is a flow diagram illustrating a method for preserving video in response to an event.

Referring to FIG. 14, a method (or process) 800 is shown. The method 800 may preserve the video files 500*a*-500*n* in response to an event. The method 800 generally comprises a step (or state) 802, a decision step (or state) 804, a step (or state) 806, a decision step (or state) 808, a step (or state) 810, a step (or state) 812, a step (or state 814, a step (or state) 816, and a step (or state) 818.

The state 802 may start the method 800. Next, in the decision state 804, the server 120 may determine whether an event has occurred. For example, the server 120 may receive a notification that an event has occurred from a third party (e.g., a police report). In another example, the server 120 may have a time and/or location of an event that is known in advance stored. If the event has not occurred, the method 800 may move to the state 810. If the event has occurred, the method 800 may move to the state 806. In the state 806, the database 130 may compare the event parameters (e.g., GPS coordinates and/or a time range) to the metadata 184*a*-184*n* (or the other metadata 184*a*'-184*n*'). Next, the method 800 may move to the decision state 808.

In the decision state 808, the database 130 may determine whether any of the stored metadata 184*a*-184*n* corresponds to the event parameters. If none of the metadata 184*a*-184*n* corresponds to the event parameters, the method 800 may move to the state 810. In the state 810, the capture devices 110*a*-110*n* may record the video data according to the normal settings. Next, the method 800 may move to the state 818. In the decision state 808, if the metadata 184*a*-184*n* does correspond to the event parameters, the method 800 may move to the state 812. In the state 812, the database 130 may determine the capture devices 110*a*-110*n* that store the video files 500*a*-500*n* corresponding to the event parameters based on the device ID. For example, the metadata 184*a*-184*n* may comprise an identification code (or hash) of one of the capture devices 110*a*-110*n* that captured one of the clips 182*a*-182*n* corresponding to the event. Next, in the state 814, the server 120 may transmit the interrupt signal INTR to the capture devices 110*a*-110*n* that have been identified by the database 130 as having captured the video files 500*a*-500*n* that correspond to the event parameters. The signal INTR may indicate which of the video files 500*a*-500*n* to preserve. In the state 816, the processor 452 may set the preserve flags 508*a*-508*n* for any of the video files 500*a*-500*n* that correspond to the event parameters (e.g., identified based on the signal INTR). Next, the method 800 may move to the state 818. The state 818 may end the method 800.

Figure 15:
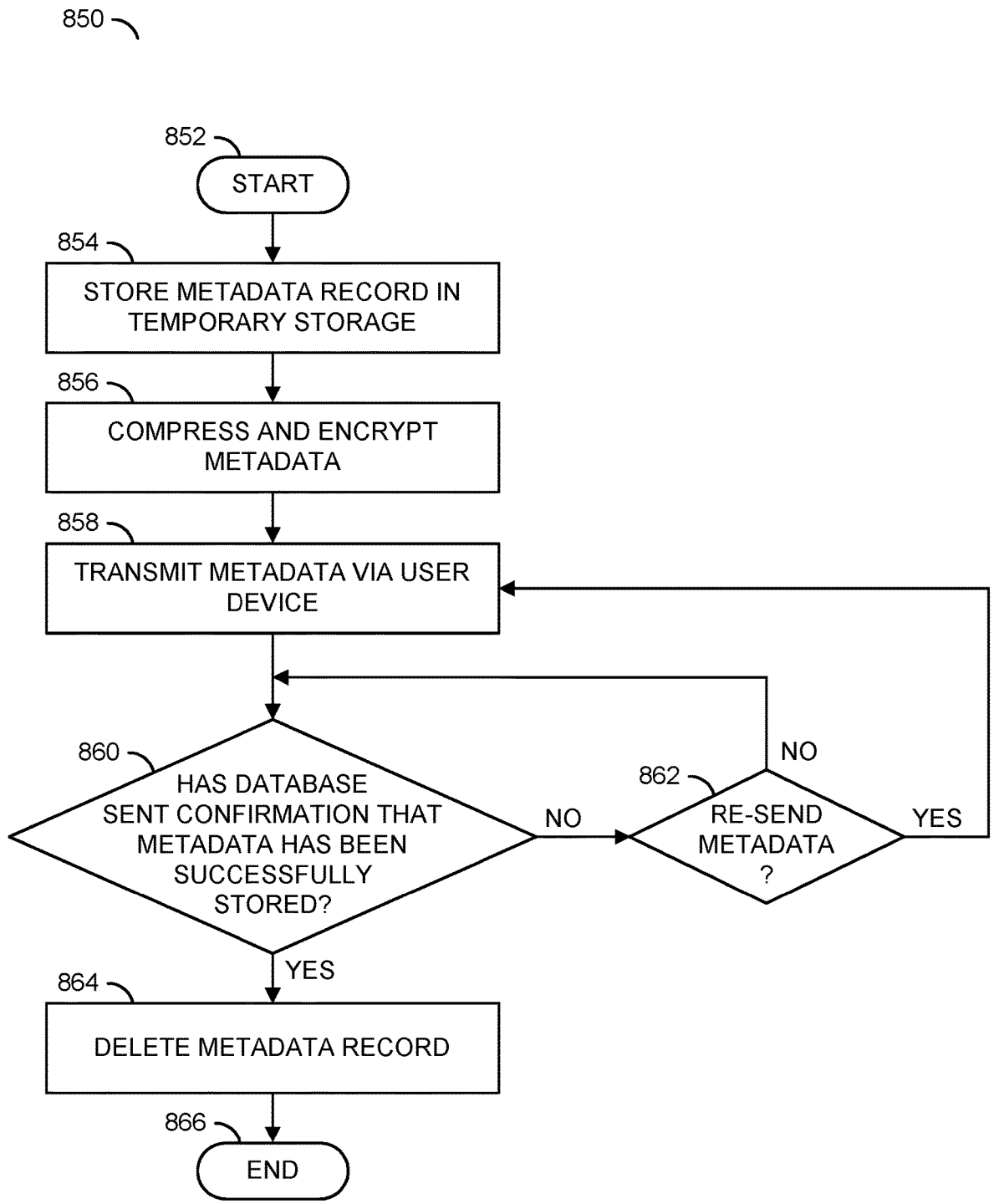
FIG. 15 is a flow diagram illustrating a method for implementing a handshake operation for communicating metadata.

Referring to FIG. 15, a method (or process) 850 is shown. The method 850 may implement a handshake operation for communicating metadata. The method 850 generally comprises a step (or state) 852, a step (or state) 854, a step (or state) 856, a step (or state) 858, a decision step (or state) 860, a decision step (or state) 862, a step (or state) 864, and a step (or state) 866.

The state 852 may start the method 850. In the state 854, the processor 452 may store the metadata generated by the video analytics module 490 in the temporary storage (e.g., the metadata cache 520). Next, in the state 856, the processor 452 may compress and/or encrypt the metadata stored in the metadata cache 520. In the state 858, the wireless communication module 450 may transmit the compressed and/or encrypted metadata records to the database 130 via the user communication device(s) 112*a*-112*n*. Next, the method 850 may move to the decision state 860.

In the decision state 860, the processor 452 may determine whether the database 130 has sent confirmation that the metadata records communicated have been successfully stored as the metadata 184*a*-184*n*. For example, the interrupt signal INTR may comprise a handshake signal to indicate that the metadata 184*a*-184*n* (or the other metadata 184*a*'-184*n*') has been stored successfully. Implementing the handshake signal may ensure that metadata is not deleted by the circuit 114 before being stored as the metadata 184*a*-184*n* in the database 130. If the database 130 has sent confirmation that the metadata has been successfully stored, the method 850 may move to the state 864. In the decision state 860, if the database 130 has not sent confirmation that the metadata has been successfully stored, the method 862 may move to the decision state 862.

In the decision state 862, the processor 452 may determine whether to re-send the metadata. If the processor 452 determines not to re-send the metadata, the method 850 may return to the decision state 860 (e.g., to continue to wait for the handshake signal from the database 130). If the processor 452 determines to re-send the metadata, the method 850 may return to the state 858. For example, the metadata may be re-sent if a pre-determined amount of time has passed (e.g., 1 minute). In another example, the metadata may be re-sent based on a response code received from the server 120 and/or the network 60. For example, a response code may indicate that the server 120 has not been found (e.g., a temporary network outage). In another example, the response code may indicate that the wireless communication module 450 does not have proper authentication to communicate with the server 120. The determination for re-sending the metadata may be varied according to the design criteria of a particular implementation.

In the state 864, the processor 452 may delete the metadata record (e.g., metadata that has successfully been transmitted by the database 130) from the metadata cache 520. Next, the method 850 may move to the state 866. The state 866 may end the method 850.

The functions performed by the diagrams of FIGS. 10-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, SSD (solid state drive), optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
   a capture device configured to (i) capture video, (ii) implement a processor configured to (a) perform video analysis on said captured video to extract metadata corresponding to said captured video, (iii) store said captured video and (iv) communicate with a wireless communication device; and
   a database configured to (i) communicate with said wireless communication device, (ii) generate search results for a user based on said metadata received from said capture device and (iii) provide said user at least one of (a) said metadata and (b) said captured video based on said search results, wherein
   (A) said metadata is (i) extracted by said processor of said capture device to generate information about objects present in said captured video, (ii) uploaded to said database for storage without said captured video and (iii) used to associate said information about said objects with said captured video stored on said capture device,
   (B) said database provides said capture device an interrupt request to enable said processor to preserve a portion of said captured video that is associated with said search results by said metadata and
   (C) said processor of said capture device is configured to flag said portion of said captured video in response to said interrupt request to prevent said processor from overwriting said portion of said captured video stored by said capture device.

2. The system according to claim 1, wherein said portion of said captured video that has been preserved is uploaded separate from said metadata in response to a download request from said user.

3. The system according to claim 2, wherein said portion of said captured video is uploaded (i) to a server in a first mode and (ii) temporarily to said database in a second mode.

4. The system according to claim 1, wherein said portion of said captured video is preserved for a pre-determined amount of time.

5. The system according to claim 4, wherein said pre-determined amount of time is set according to local legislation.

6. The system according to claim 4, wherein said pre-determined amount of time is set according to a subscription tier of said user.

7. The system according to claim 1, wherein (i) a memory of said capture device is configured to store said captured video, (ii) each storage location of said memory comprises one or more flag bits and (iii) said processor of said capture device is configured to flag said portion of said captured video by modifying said flag bits.

8. The system according to claim 7, wherein said capture device stores a next portion of said captured video (i) in an empty one of said storage locations if one or more of said storage locations is empty and (ii) in one of said storage locations storing an oldest portion of said captured video that does not have said flag bits set if none of said storage locations are empty.

9. The system according to claim 1, wherein said search results are not generated for said user unless said user has a subscription to access said database.

10. The system according to claim 1, wherein (i) said capture device is configured to generate a notification when said portion of said captured video expires, (ii) said notification comprises an identification of said portion of said captured video that has expired and (iii) said metadata stored by said database is updated in response to said notification to indicate that said portion of said captured video corresponding to said identification is no longer available.

11. The system according to claim 1, wherein said metadata comprises alphanumeric characters and symbols extracted from said captured video for determining information used to identify a license plate.

12. The system according to claim 1, wherein said metadata comprises at least one of a time of capture of said captured video, a date of capture of said captured video, location coordinates of said capture of said captured video, a direction of a field of view of said capture device, an altitude of said capture of said captured video, an identification number of said capture device, an expiration status of said captured video, characteristics of roadway features and characteristics of objects detected in said captured video.

13. The system according to claim 1, wherein (i) said capture device is installed in a vehicle as a dashboard camera, (ii) a field of view of said capture device is configured to capture a view from said vehicle and (iii) said processor of said capture device is configured to generate said metadata used to determine roadway data in response to said video analysis.

14. The system according to claim 13, wherein said roadway data comprises at least one of license plates, street signs, road markings, curbs, traffic signals, pedestrians, a make of a vehicle, a model of a vehicle, a year of a vehicle, road hazards and construction barriers.

15. The system according to claim 1, wherein (i) said user accesses said database using an interface generated by an app, (ii) said interface enables a query of said metadata in said database by said user, (iii) said search results are displayed on said interface, (iv) said app enables said user to request said captured video based on said search results and (v) said database retrieves said captured video associated with said metadata from said capture device in response to said request.

16. The system according to claim 1, wherein at least one of (a) said metadata and (b) said captured video are used as evidence for at least one of vehicle accident investigations, asset recovery, vehicle theft, locating persons-of-interest, crime investigations and deep learning for autonomous driving training based on roadway data.

17. The system according to claim 1, wherein said interrupt request for preserving said captured video is further generated in response to an event.

18. The system according to claim 17, wherein (i) said capture device is one of a plurality of capture devices implemented by said system, (ii) said interrupt request is transmitted to one or more of said capture devices within a range of said event and (iii) said range of said event is determined based on at least one of location coordinates and a time.

19. The system according to claim 17, wherein said event comprises at least one of a person of interest, a crime, a parade, a sports competition, a natural phenomenon, conditions used for machine learning for autonomous driving and situations determined to be important.

20. The system according to claim 1, wherein (i) said capture device is implemented as a stationary camera and (ii) said stationary camera is configured to generate metadata used to determine roadway data in response to said video analysis.

* * * * *